United States Patent
Nakayama

(10) Patent No.: US 11,521,395 B2
(45) Date of Patent: Dec. 6, 2022

(54) IMAGE PROCESSING DEVICE, IMAGE PROCESSING METHOD, AND PROGRAM

(71) Applicant: Sony Semiconductor Solutions Corporation, Kanagawa (JP)

(72) Inventor: Satoshi Nakayama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 248 days.

(21) Appl. No.: 16/615,976

(22) PCT Filed: May 16, 2018

(86) PCT No.: PCT/JP2018/018840
§ 371 (c)(1),
(2) Date: Nov. 22, 2019

(87) PCT Pub. No.: WO2018/221209
PCT Pub. Date: Dec. 6, 2018

(65) Prior Publication Data
US 2020/0110947 A1 Apr. 9, 2020

(30) Foreign Application Priority Data
May 30, 2017 (JP) .............................. JP2017-106645

(51) Int. Cl.
*G06V 20/58* (2022.01)
*G06T 5/00* (2006.01)
(Continued)

(52) U.S. Cl.
CPC ................ *G06V 20/58* (2022.01); *B60R 1/00* (2013.01); *G06T 7/246* (2017.01); *G06V 20/588* (2022.01);
(Continued)

(58) Field of Classification Search
USPC ....................................................... 382/103
See application file for complete search history.

(56) References Cited

U.S. PATENT DOCUMENTS

| | | | |
|---|---|---|---|
| 11,158,076 B2* | 10/2021 | Tsunashima | ............ G06T 7/593 |
| 2005/0179688 A1* | 8/2005 | Chernichenko | ......... G06T 5/006 |
| | | | 345/427 |
| 2005/0212931 A1* | 9/2005 | Gallagher | .......... H04N 5/23258 |
| | | | 348/239 |

(Continued)

FOREIGN PATENT DOCUMENTS

| | | | |
|---|---|---|---|
| EP | 2 151 357 A1 | 2/2010 | |
| JP | 2009-081496 A | 4/2009 | |

(Continued)

OTHER PUBLICATIONS

International Written Opinion dated Jul. 24, 2018 in connection with International Application No. PCT/JP2018/018840, and English translation thereof.

(Continued)

*Primary Examiner* — Ishrat I Sherali
(74) *Attorney, Agent, or Firm* — Wolf, Greenfield & Sacks, P.C.

(57) ABSTRACT

The present technology relates to an image processing device, an image processing method, and a program capable of making it easier to recognize standing objects.
Movement transformation of moving a subject position where a subject appears in a target image to be processed is performed, depending on a subject distance from a vanishing point in the target image to the subject position. The present technology can be applied to, for example, the image processing and the like of an image taken by a camera unit onboard a vehicle or other moving body.

8 Claims, 27 Drawing Sheets

(51) Int. Cl.
  *G06T 7/246* (2017.01)
  *B60R 1/00* (2022.01)
  *H04N 7/18* (2006.01)
  *G06V 20/56* (2022.01)
(52) U.S. Cl.
  CPC ... *H04N 7/181* (2013.01); *G06T 2207/10016* (2013.01)

(56) References Cited

U.S. PATENT DOCUMENTS

| | | | |
|---|---|---|---|
| 2015/0086132 A1 | 3/2015 | Tsukagoshi | |
| 2017/0347030 A1* | 11/2017 | Guerreiro | H04N 5/23254 |
| 2018/0365859 A1* | 12/2018 | Oba | G06T 7/85 |

FOREIGN PATENT DOCUMENTS

| | | |
|---|---|---|
| JP | 2010171914 A | 8/2010 |
| JP | 2011-185753 A | 9/2011 |
| JP | 2012-010145 A | 1/2012 |
| JP | 2012147149 A | 8/2012 |
| JP | 2013-110712 A | 6/2013 |
| JP | 2013-197816 A | 9/2013 |
| JP | 2015015527 A | 1/2015 |
| JP | 2015-061292 A | 3/2015 |
| WO | WO-2011158304 A1 | 12/2011 |

OTHER PUBLICATIONS

International Preliminary Report on Patentability dated Dec. 12, 2019 in connection with International Application No. PCT/JP2018/018840, and English translation thereof.

Extended European Search Report dated Mar. 19, 2020 in connection with European Application No. 18809783.6.

International Search Report dated Jul. 24, 2018 in connection with International Application No. PCT/JP2018/018840, and English translation thereof.

* cited by examiner

FIG. 11
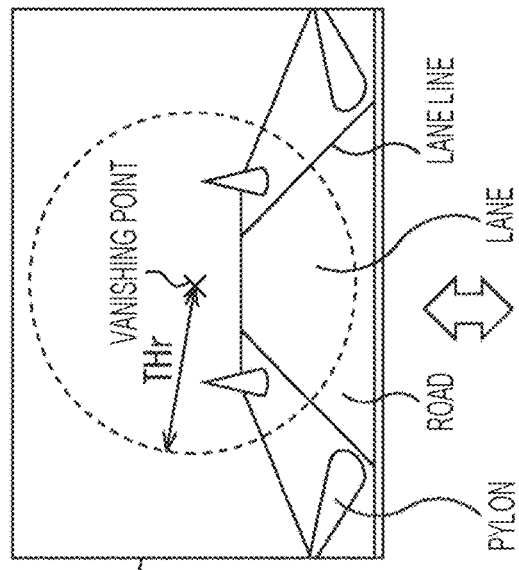
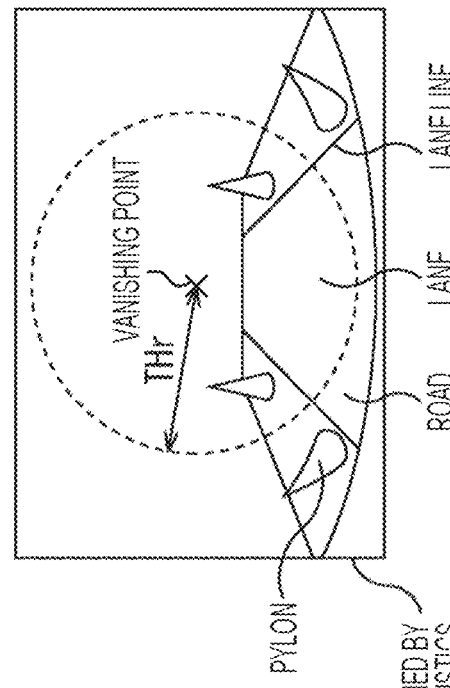
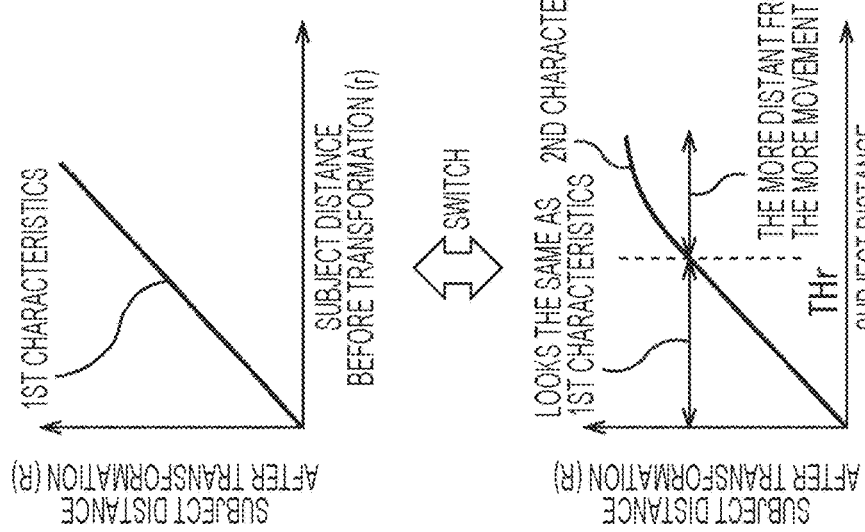

IMAGE PROCESSING DEVICE, IMAGE PROCESSING METHOD, AND PROGRAM

CROSS-REFERENCE TO RELATED APPLICATIONS

This is a U.S. National Stage Application under 35 U.S.C. § 371, based on International Application No. PCT/JP2018/018840, filed in the Japanese Patent Office as a Receiving Office on May 16, 2018, which claims priority under 35 U.S.C. § 119(a)-(d) or 35 U.S.C. § 365(b) to Japanese Patent Application Number JP2017-106645, filed in the Japanese Patent Office on May 30, 2017, each of which applications is hereby incorporated by reference in its entirety.

TECHNICAL FIELD

The present technology relates to an image processing device, an image processing method, and a program, and more particularly, relates to an image processing device, an image processing method, and a program capable of making it easier to recognize standing objects, for example.

BACKGROUND ART

For example, onboard camera-related technologies that are related to onboard cameras include a distortion correction process that corrects distortion in a taken image taken using a wide-angle lens (for example, Patent Documents 1 and 2), and a camera calibration that computes a lens distortion parameter and a vanishing point position (for example, Patent Document 3).

CITATION LIST

Patent Document

Patent Document 1: Japanese Patent Application Laid-Open No. 2009-081496
Patent Document 2: Japanese Patent Application Laid-Open No. 2013-110712
Patent Document 3: Japanese Patent Application Laid-Open No. 2011-185753

SUMMARY OF THE INVENTION

Problems to be Solved by the Invention

Meanwhile, for example, in an automobile, there are systems (viewing systems) that work to capture and display a forward image with a camera (front camera) set up in the front grille and systems that work to capture and display a rearward image with a camera (rear camera) installed in the rear license plate, in the handle that opens and closes the trunk, or the like.

An image provided by a viewing system (hereinafter also referred to as a viewing image) is generated using a taken image taken by an onboard camera. For example, in a viewing system, a viewpoint transformation that transforms a taken image taken by an onboard camera into a viewpoint transformation image seen from a predetermined viewpoint, such as the viewpoint of the driver, can be performed, and the viewpoint transformation image obtained as a result of the viewpoint transformation can be displayed as a viewing image.

The viewpoint transformation of the taken image can be performed by an affine transformation of the taken image, for example, but an affine transformation hypothesizes that all subjects appearing in the taken image exist in any defined plane or curve, such as a road, for example, and is performed under the assumption that the image of the target exists in the plane or curve. For this reason, in the case of assuming, for example, that a subject exists in the plane of the road, if a vehicle (such as an automobile or a motorcycle) or a pedestrian that exists as a solid object not in the plane of the road or some other standing object standing up on the road appears as a subject in the taken image that is subjected to the viewpoint transformation, the standing object appearing in the viewpoint transformation obtained by the viewpoint transformation will be transformed into an image that is collapsed onto the road (an oblique state).

In the case in which a standing object appears in a collapsed state in the viewpoint transformation image, a user such as a driver who sees the viewpoint transformation image may have difficulty recognizing the standing object as a standing object (or a solid object).

The present technology has been devised in light of such circumstances, and makes it easier to recognize standing objects.

Solutions to Problems

An image processing device or a program according to the present technology is an image processing device or a program causing a computer to function as such an image processing device including: an acquisition unit configured to acquire a target image to be processed; and a movement transformation unit configured to perform movement transformation of moving a subject position where a subject appears in the target image, depending on a subject distance from a vanishing point in the target image to the subject position.

An image processing method according to the present technology is an image processing method including: acquiring a target image to be processed; and performing movement transformation of moving a subject position where a subject appears in the target image, depending on a subject distance from a vanishing point in the target image to the subject position.

In the image processing device, the image processing method, and the program according to the present technology, a target image to be processed is acquired; and movement transformation of moving a subject position where a subject appears in the target image is performed, depending on a subject distance from a vanishing point in the target image to the subject position.

Moreover, the image processing device and the signal processing device may be an independent device or an internal block that constitutes a single device.

Further, the program may be provided by being transmitted via a transmission medium or recorded on a recording medium.

Effects of the Invention

According to the present technology, it becomes possible to display standing objects in an easily recognized manner.

Further, the effects described herein are not necessarily limited, and any effect described in the present disclosure may be included.

BRIEF DESCRIPTION OF DRAWINGS

FIG. 11 is a diagram explaining an example of switching the transformation characteristics to use in the movement transformation.

MODE FOR CARRYING OUT THE INVENTION

<Image Processing System Applying Present Technology>

Figure 1:
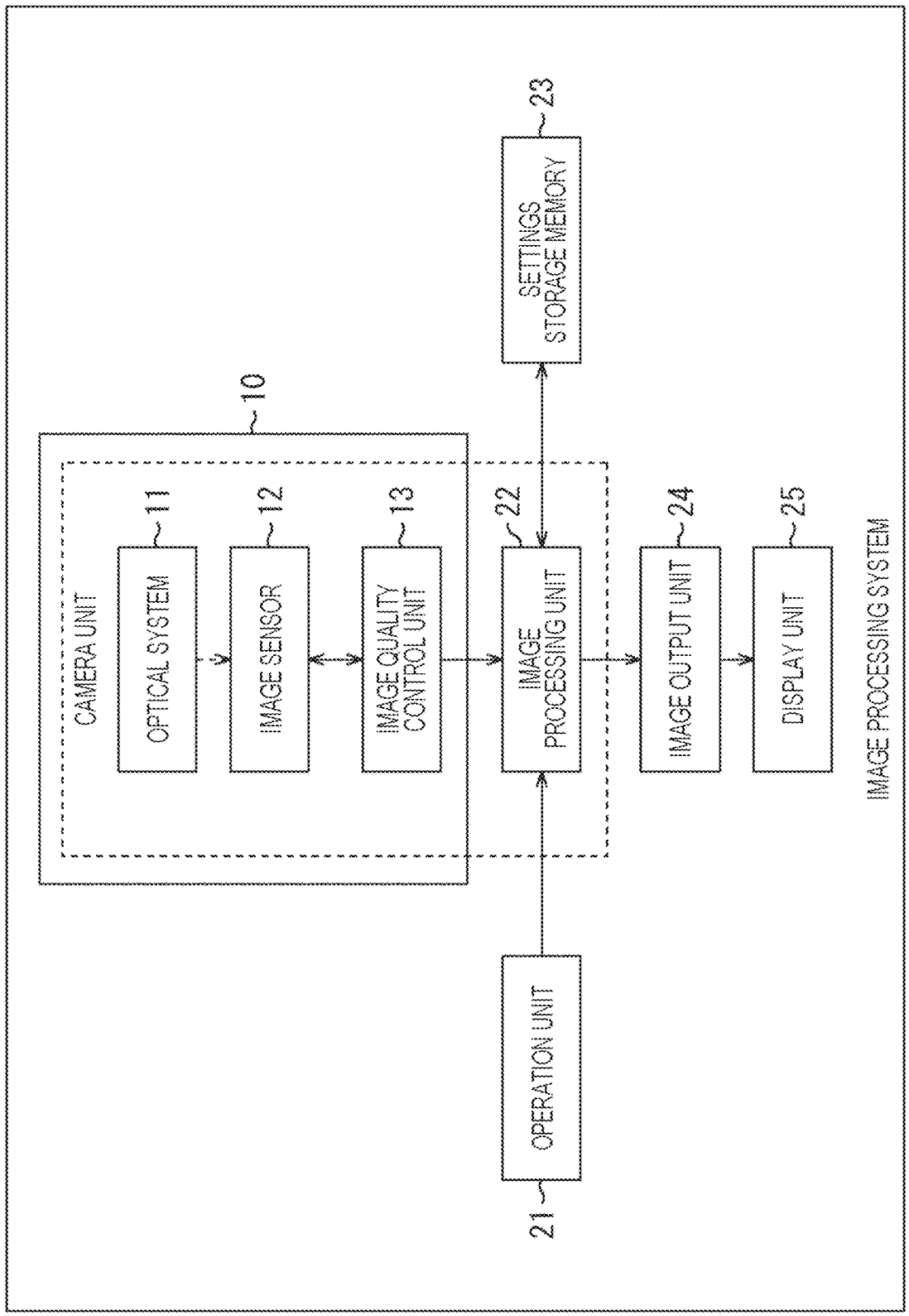
FIG. 1 is a block diagram illustrating an exemplary configuration of an embodiment of an image processing system applying the present technology.

FIG. 1 is a block diagram illustrating an exemplary configuration of an embodiment of an image processing system applying the present technology.

In FIG. 1, the image processing system includes a camera unit 10, an operation unit 21, an image processing unit 22, settings storage memory 23, an output image unit 24, and a display unit 25.

The camera unit 10 includes an optical system 11, an image sensor 12, and an image quality control unit 13.

The optical system 11 includes optical components such as a lens and a diaphragm not illustrated, and causes light from a subject to be incident on the image sensor 12.

The image sensor 12 takes an image. That is, by receiving and photoelectrically converting light incident from the optical system 11, the image sensor 12 generates an image signal as an electric signal corresponding to the light. The (image signal of the) taken image, which is the image obtained by the image sensor 12, is supplied from the image sensor 12 to the image quality control unit 13.

The image quality control unit 13 controls parameters when the image sensor 12 takes a taken image, such as controlling the exposure time and controlling binning, for example. Also, the image quality control unit 13 performs signal processing related to image quality, such as noise reduction (NR) and developing (demosaicing), on the taken image supplied from the image sensor 12, and supplies the result to the image processing unit 22.

The operation unit 21 is operated by the user, and supplies an operation signal corresponding to the operation to the image processing unit 22. Herein, operations of the operation unit 21 include not only physical operations (such as touching a touch panel, for example), but also any kind of action by the user that serves as a substitute for a physical operation, such as uttering speech that acts as a command or the like, performing gesture, or moving one's line of sight.

The image processing unit 22 performs image processing on the taken image supplied from (the image quality control unit 13 of) the camera unit 10, and supplies an image obtained as a result of the image processing to the output image unit 24.

The image processing of the image processing unit 22 is performed according to an operation signal from the operation unit 21 and information stored in the settings storage memory 23.

The settings storage memory 23 stores settings of the image processing by the image processing unit 22 and other necessary information.

The output image unit 24 performs display control that outputs the image supplied from the image processing unit 22 to the display unit 25 and causes the image to be displayed.

The display unit 25 includes a liquid crystal display (LCD) or some other type of display device, for example, and displays the image output by the output image unit 24 as a viewing image, for example.

Herein, in FIG. 1, the taken image is assumed to be supplied from the image quality control unit 13 to the image processing unit 22 by digital transmission. This is because if the taken image is supplied from the image quality control unit 13 to the image processing unit 22 by digital transmission, even if a relatively long connecting line is drawn out to connect the image quality control unit 13 and the image processing unit 22, the image signal of the taken image does not become degraded in the digital transmission between the image quality control unit 13 and the image processing unit 22.

Note that, hypothetically, if the taken image is supplied from the image processing unit 22 to the output image unit 24 by analog transmission, it will be necessary to convert the digital signal to an analog signal in or before the output image unit 24, and in many cases such conversion is associated with a drop in image quality, such as reduced resolution due to image resizing. In this case, the camera unit 10 is configured such that the image processing unit 22 is included along with the optical system 11 to the image quality control unit 13, and the image is supplied from the image quality control unit 13 to the image processing unit 22 by digital transmission. This is because, by including the image processing unit 22 in the camera unit 10, the connecting line between the image quality control unit 13 and the image processing unit 22 can be shortened, which suppresses degradation of the image signal, while in addition, by inputting a digital signal directly into the image processing unit 22 from the image quality control unit 13, performing processing such as image cropping, and then converting to an analog signal, a reduction in resolution can be suppressed.

Also, in FIG. 1, the image after the image processing by the image processing unit 22 is displayed as a viewing image, but the image after the image processing by the image processing unit 22 may not only be displayed as a viewing image, but also submitted for use with other types of driving assistance.

<Exemplary Configuration of Moving Body on which Image Processing System May be Mounted>

Figure 2:
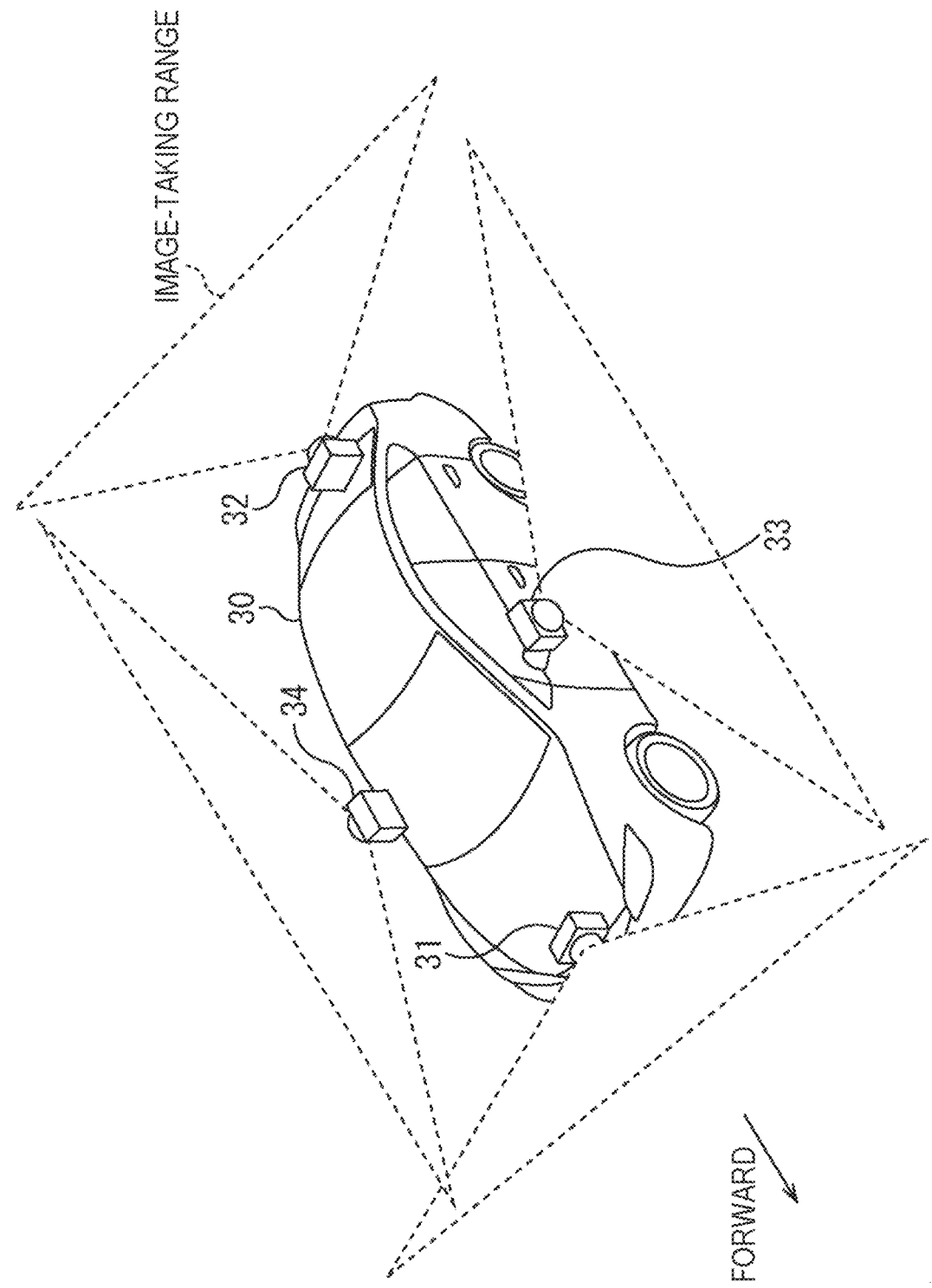
FIG. 2 is a perspective view illustrating an exemplary configuration of the external appearance of a moving body on which the image processing system of FIG. 1 may be mounted.

FIG. 2 is a perspective view illustrating an exemplary configuration of the external appearance of a moving body on which the image processing system of FIG. 1 may be mounted.

Herein, for example, an automobile, an electric vehicle, a hybrid electric vehicle, a motorcycle, a bicycle, a personal mobility device, an aircraft, a drone, a ship, a robot, or the like can be adopted as the moving body on which the image processing system of FIG. 1 may be mounted.

In FIG. 2, a vehicle 30, namely an automobile, is adopted as the moving body on which the image processing system of FIG. 1 may be mounted.

A camera unit 31 is provided in a front-center part of the vehicle 30, and a camera unit 32 is provided in a rear-center part. Also, a camera unit 33 is provided in a portion where a side mirror is provided on the left side as seen when facing in the forward direction of the vehicle 30, and a camera unit 34 is provided in a portion where a side mirror is provided on the right side of the vehicle 30. Note that, in FIG. 2, the dashed lines represent the image-taking ranges of the camera units 31 to 34.

The camera unit 31 takes an image in the forward direction of the vehicle 30, while the camera unit 32 takes an image in the rearward direction of the vehicle 30. The camera unit 33 takes an image in the leftward direction of the vehicle 30, while the camera unit 34 takes an image in the rightward direction of the vehicle 30.

To enable the camera units 31 to 34 to take images over as wide a range as possible, a wide-angle lens such as a fisheye lens can be adopted, for example.

Hereinafter, the image processing system of FIG. 1 will be described by assuming that the camera unit 10 is adopted as the camera unit 32 in the front-center part from among the camera units 31 to 34, for example, and the image processing system of FIG. 1 is mounted onboard the vehicle 30.

Herein, regarding the vehicle 30 with the camera units 31 to 34 mounted onboard as illustrated in FIG. 2, in the case of generating an overhead image, which is a viewing image of the vehicle 30 as seen from above, for the purpose of parking assistance or the like, for example, it is necessary to adopt an ultra-wide-angle camera adopting a fisheye lens or the like as the camera unit 31 capable of taking a wide-angle image having an angle of view close to 180 degrees centered on the installation position of the camera unit 31, and take an image of the surroundings of the vehicle 30. The same applies to the camera units 32 to 34.

As another example, in the case of generating a wide-range image to enable the user to check for other vehicles or the like approaching from behind to the left or right of the vehicle 30, it is necessary to use the camera unit 32 in the rear-center part of the vehicle 30 as well as the camera units 33 and 34 on the left and right sides of the vehicle 30 to take wide-angle images.

Although it is possible to provide the vehicle 30 with a plurality of camera units having different angles of view in the images that can be taken for each use and the like, in this case, the number of camera units provided in the vehicle 30 increases.

Accordingly, it is desirable to provide the vehicle 30 with a fewer number of camera units capable of taking wide-angle images, or in other words for example, to provide the four camera units 31 to 34 and generate various viewing images from the wide-angle images taken by the camera units 31 to 34.

However, because the wide-angle images taken by the camera units 31 to 34 are taken using a fisheye lens, for example, the taken images are distorted compared to the images that a human being perceives with the sense of vision. For this reason, in the case of generating a viewing image to present to the user from wide-angle images taken by the camera units 31 to 34, it is necessary to correct distortion in the wide-angle images as needed, that is, to transform the projection method, to make it easier for the user to see.

The central projection method is suitable as the projection method of an image expressing the world that human beings are accustomed to seeing. For example, the projection method of an image taken with a pinhole camera is the central projection method.

On the other hand, in the case in which a fisheye lens for example is adopted and wide-angle images are taken in the camera units 31 to 34, the projection method of the images taken by the camera units 31 to 34 will be the equidistant projection method, for example.

Consequently, to generate a viewing image that is easy to see for the user, it is necessary to perform a projective transformation to transform the images of the equidistant projection method taken by the camera units 31 to 34 to images of the central projection method.

However, the images after the projective transformation obtained by performing the projective transformation to transform the images of the equidistant projection method to images of the central projection method become images that lack a visual sense of depth, due to the problem of perspective. Furthermore, in the images after the projective transformation, standing objects that stand up on the ground may become oblique, and in addition, the farther away from the optical axis, the more the standing objects become spread out into the distance.

For an image of the central projection method, an image height (distance from the optical axis) h1 is expressed by the formula h1=f×tan θ, whereas for an image of the equidistant projection method, an image height h2 is expressed by the formula h2=fθ. Herein, f represents the focal length of the lens at the time of taking an image, and θ represents the angle obtained between a light beam incident on the lens and the optical axis.

From the formulas h1=f×tan θ and h2=fθ, the projective transformation from the equidistant projection method to the central projection method is expressed by the formula h1=f×tan (h2/f). Consequently, in the image after the projective transformation obtained by performing the projective transformation to transform the image of the equidistant projection method to the central projection method, the greater the position of the image height h2 in the image of the equidistant projection method, the more the image height h1 moves to a greater position. In other words, as the position becomes more distant from the optical axis in the image of the equidistant projection method, the position moves farther away from the optical axis in the image after the projective transformation.

Consequently, for example, in the case of generating an overhead image and the like, if the image after the projective transformation obtained by transforming an image from the equidistant projection method to the central projection method is subjected to a viewpoint transformation that points the optical axis of a virtual camera unit taking the image downward, in the image after the viewpoint transformation, solid objects on the road (road surface) tend to appear at positions distant from the optical axis and tend to be stretched outward (in the direction going away from the optical axis).

In the image processing unit 22, a projective transformation like the above and other types of image processing are performed.

<Exemplary Configuration of Image Processing Unit 22>

Figure 3:
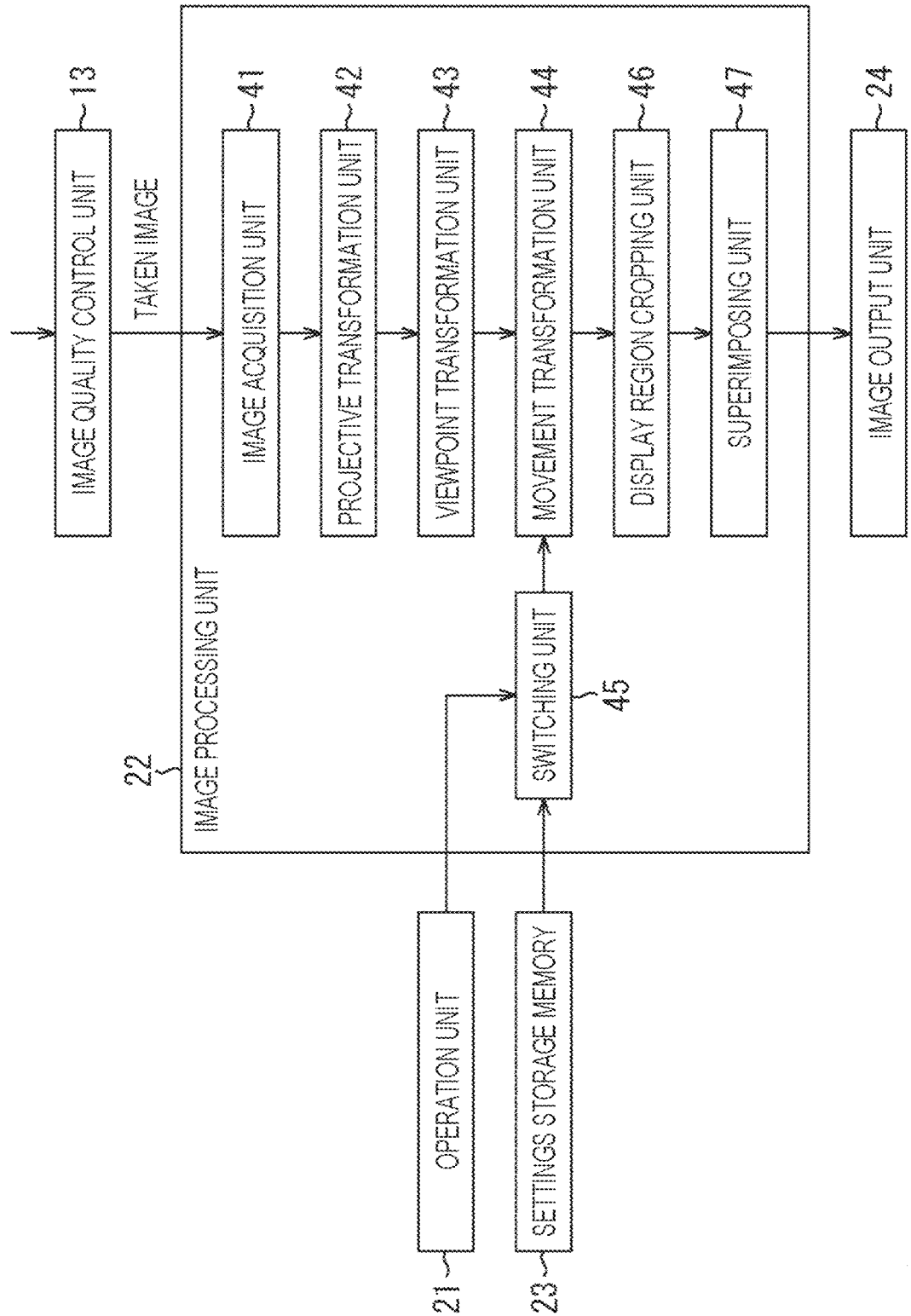
FIG. 3 is a block diagram illustrating an exemplary configuration of the image processing unit 22.

FIG. 3 is a block diagram illustrating an exemplary configuration of the image processing unit 22 in FIG. 1.

In FIG. 3, the image processing unit 22 includes an image acquisition unit 41, a projective transformation unit 42, a viewpoint transformation unit 43, a movement transformation unit 44, a switching unit 45, a display region cropping unit 46, and a superimposing unit 47.

The image acquisition unit 41 acquires, as a target image to be subjected to image processing, a taken image supplied from the image quality control unit 13 of the camera unit 10, and supplies the target image to the projective transformation unit 42.

The projective transformation unit 42 transforms the projection method of the taken image treated as the target image supplied from the image acquisition unit 41.

In other words, a wide-angle lens such as a fisheye lens is adopted as the lens included in the optical system 11 of the camera unit 10 (FIG. 1) to make it possible to obtain an image taken over a wide image-taking range as the taken image, for example, and in the camera unit 10, a taken image of the equidistant projection method is taken, for example.

Because the image of a subject appearing in the taken image of the equidistant projection method is distorted, the projective transformation unit 42 performs a projective transformation to transform the taken image of the equidistant projection method to a taken image of the central projection method in which the image is not distorted, for example. The projective transformation of the projective transformation unit 42 is performed by taking into consideration the image height characteristics of the lens included in the optical system 11 of the camera unit 10.

The projective transformation unit 42 supplies the viewpoint transformation unit 43 with the projective transformation image obtained as a result of the projective transformation of the taken image treated as the target image from the image acquisition unit 41.

Note that herein, in the projective transformation of the projective transformation unit 42, a taken image of the equidistant projection method is transformed into a taken image of the central projection method, but the projection method of the taken image subjected to the projective transformation is not limited to the equidistant projection method. Similarly, the projection method of the taken image after the projective transformation (the projective transformation image) is not limited to the central projection method. For example, the stereographic projection method or any other projection method in which a vanishing point exists can be adopted.

The viewpoint transformation unit 43 performs a viewpoint transformation that transforms the projective transformation image supplied from the projective transformation unit 42 into a viewpoint transformation image seen from a predetermined viewpoint.

Herein, a viewpoint includes a viewpoint position and a line-of-sight direction. The viewpoint position and the line-of-sight direction acting as the viewpoint of a taken image taken by the camera unit 10 are expressed by the position of the camera unit 10 and the optical axis direction of the camera unit 10, respectively.

For example, the viewpoint transformation unit 43 sets (assumes) a virtual camera unit, and performs a viewpoint transformation that transforms the projective transformation image into a viewpoint transformation image seen (taken) from the virtual camera unit.

For example, the virtual camera unit is set such that the optical axis of the virtual camera unit coincides with a vanishing point in the viewpoint transformation image.

Consequently, the viewpoint transformation of the viewpoint transformation unit 43 is performed such that the optical axis at the time of taking an image from the virtual camera unit coincides with the vanishing point in the viewpoint transformation image.

Herein, the optical axis coinciding with the vanishing point in the viewpoint transformation image means that an intersection point between the optical axis and the viewpoint transformation image coincides with the vanishing point in the viewpoint transformation image.

The viewpoint transformation unit 43 supplies the movement transformation unit 44 with the viewpoint transformation image obtained as a result of the viewpoint transformation of the projective transformation image.

Note that at this point, the viewpoint transformation is performed after performing the projective transformation, but the order of the projective transformation and the viewpoint transformation may also be reversed. In other words, the projective transformation can be performed after performing the viewpoint transformation.

The movement transformation unit 44 performs movement transformation that moves a subject position in the viewpoint transformation image, depending on a subject distance from the vanishing point to the subject position where the subject appears in the viewpoint transformation image supplied from the viewpoint transformation unit 43. In the present embodiment, the subject distance from the vanishing point to the subject position where the subject appears in the viewpoint transformation image is defined as a transformation region parameter, but may also be defined using a different equivalent parameter instead of distance. For example, in the case in which the optical axis at the time of taking an image from the virtual camera unit coincides with the vanishing point in the viewpoint transformation image, the direction of the virtual camera unit can be substituted for the subject distance.

For example, the movement transformation unit 44 performs, on the viewpoint transformation image, movement transformation that moves the subject position depending on the subject distance, such that the subject distance becomes shorter than before the movement transformation.

Herein, the movement transformation unit 44 performs the movement transformation in accordance with transformation characteristics supplied from the switching unit 45. The transformation characteristics express a relationship between the subject distance before the movement transformation and the subject distance after the movement transformation.

The movement transformation unit 44 supplies the display region cropping unit 46 with the movement transformation image obtained as a result of the movement transformation of the viewpoint transformation image.

The switching unit 45 acquires (reads out) transformation characteristics stored in the settings storage memory 23, and supplies the read-out transformation characteristics to the movement transformation unit 44.

Herein, the settings storage memory 23 is capable of storing a plurality of (types of) transformation characteristics, for example. The switching unit 45 switches the transformation characteristics to read out from the settings storage memory 23 according to a user operation, that is, an operation signal supplied from the operation unit 21, for example. The switching unit 45, then, supplies the switched transformation characteristics to the movement transformation unit 44.

Consequently, in the image processing unit 22, the transformation characteristics to use in the movement transformation can be switched according to a user operation.

The display region cropping unit 46 crops an image of a display region to be displayed on the display unit 25 from the movement transformation image supplied from the movement transformation unit 44 as a cropped image, and supplies the cropped image to the superimposing unit 47.

Herein, in the display region cropping unit 46, besides a partial image of the movement transformation image, the entire movement transformation image can be cropped as the cropped image.

The superimposing unit 47 superimposes on-screen display (OSD) information to display as an OSD, as necessary, onto the cropped image supplied from the display region cropping unit 46, and supplies the superimposed image to the output image unit 24. Note that the projective transformation of the projective transformation unit 42, the viewpoint transformation of the viewpoint transformation unit 43, the movement transformation of the movement transformation unit 44, and the process of cropping the cropped image by the display region cropping unit 46 may be performed in any order. Alternatively, all of these processes may be performed at once as a comprehensive process.

<Taking a Taken Image with the Camera Unit 10>

Figure 4:
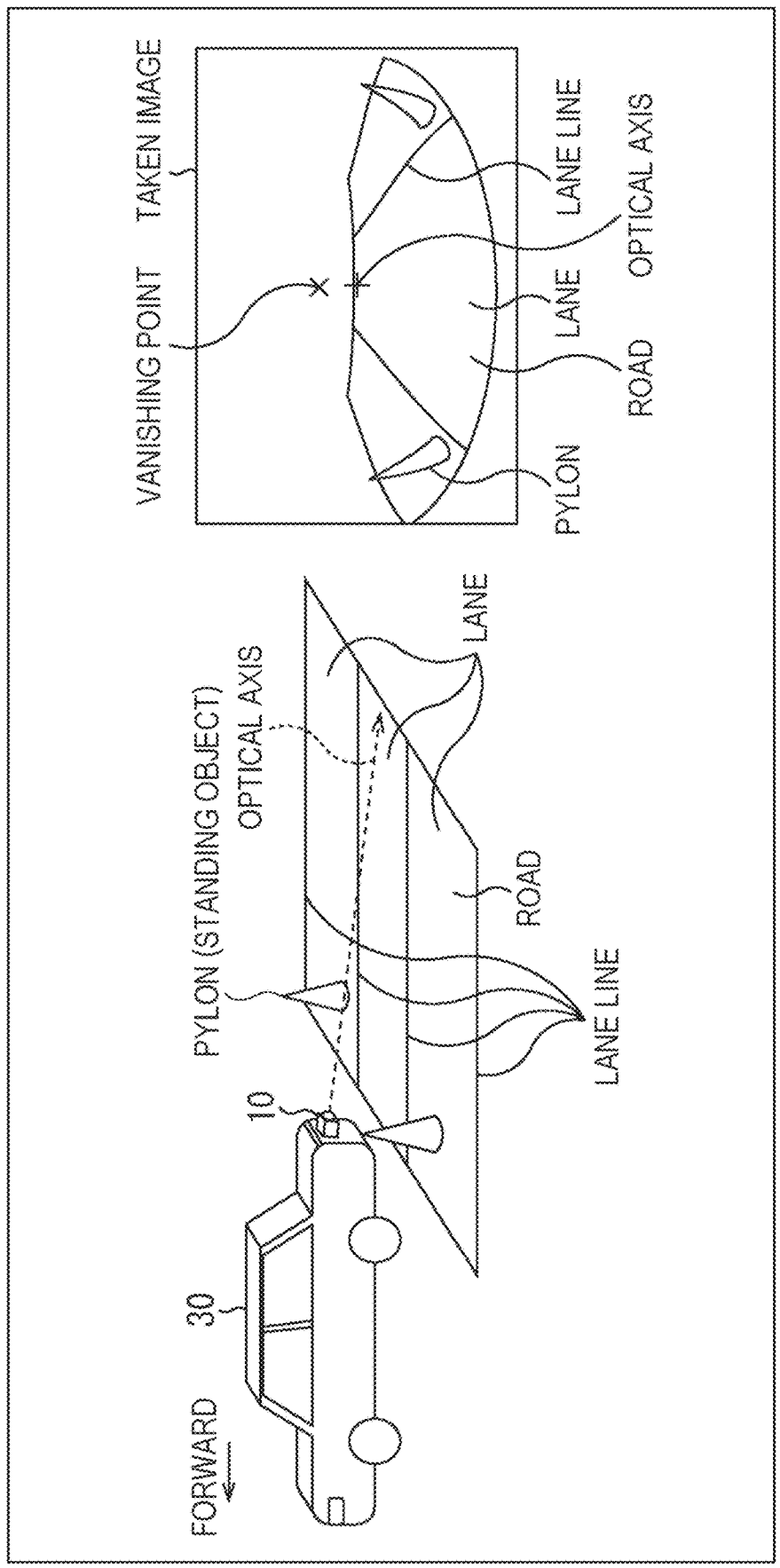
FIG. 4 is a diagram illustrating an example of how a taken image is taken by the camera unit 10 and the taken image obtained by such image-taking.

FIG. 4 is a diagram illustrating an example of how a taken image is taken by the camera unit 10 and the taken image obtained by such image-taking.

The camera unit 10 is installed in the rear-center part of the vehicle 30, with the optical axis pointed slightly downward.

The vehicle 30 exists on a three-lane road (or on the road of a parking area with three spaces), and to the left and right behind the vehicle 30, pylons acting as standing objects have been placed on the road near the lane lines that demarcate the lanes.

Note that the lines that demarcate the lanes are road center lines, lane boundary lines, road edge lines, and the like, but herein these will be collectively referred to as lane lines.

In a situation like the above, as illustrated in FIG. 4, the taken image taken by the camera unit 10 becomes an image in which the road behind the vehicle 30 and the pylons acting as standing objects placed on the road appear.

In the taken image, the optical axis of the camera unit 10 is not necessarily in agreement with the vanishing point of the lane lines of the road stretching behind the vehicle 30.

In the case in which the optical axis is not in agreement with the vanishing point, the linearity of subjects that are linear in the real world, such as the lane lines going toward the vanishing point, for example, is not preserved in the taken image, and the user looking at the taken image may feel uncomfortable.

Accordingly, in the viewpoint transformation unit 43 (FIG. 3), a virtual camera unit is set such that the optical axis of the virtual camera unit is in agreement with the vanishing point in the viewpoint transformation image, and the taken image (the projective transformation image obtained as a result of the projective transformation of the projective transformation unit 42) is transformed by the viewpoint transformation into a viewpoint transformation image as though taken from the virtual camera unit.

Herein, the taken image taken by the camera unit 10 is for example a wide-angle image and is an image in which a range with a wider angle of view than the range appearing in the taken image of FIG. 4 appears, but in the diagram, the portion in which a partial range appears and also containing the vanishing point from out of such an image in which a range with a wide angle of view appears is illustrated as the taken image. Consequently, in actuality, the image treated as the taken image continues on outside the rectangle illustrated as the taken image in FIG. 4. The same also applies to the viewpoint transformation image and other images.

<Viewpoint Transformation of Viewpoint Transformation Unit 43>

Figure 5:
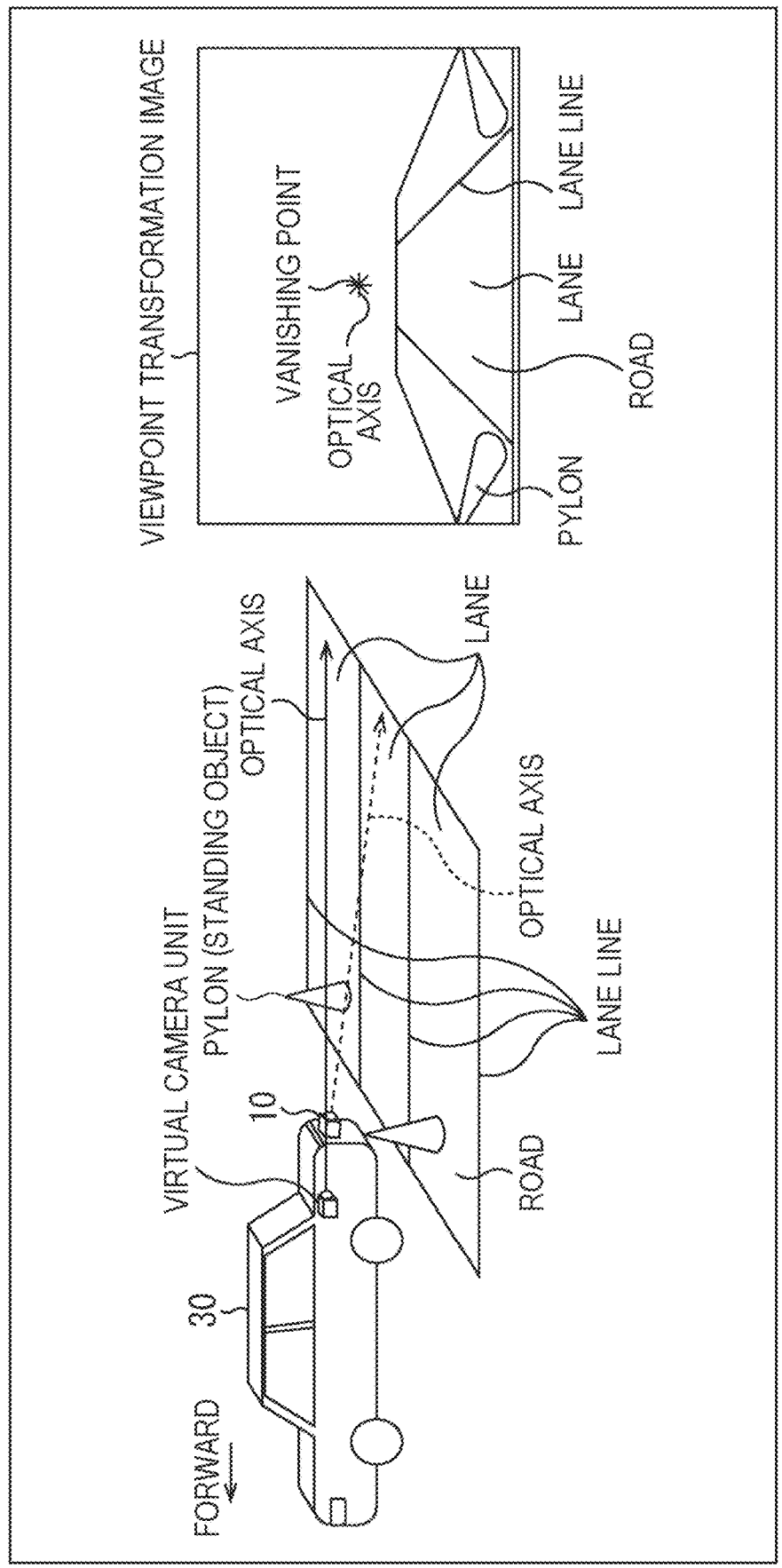
FIG. 5 is a diagram explaining the viewpoint transformation of the viewpoint transformation unit 43.

FIG. 5 is a diagram explaining the viewpoint transformation of the viewpoint transformation unit 43.

As described above, the viewpoint transformation unit 43 sets a virtual viewpoint, that is, a virtual camera unit, such that the optical axis of the virtual camera unit coincides with the vanishing point in the viewpoint transformation image.

In FIG. 5, the virtual camera unit is set such that the virtual camera unit is positioned farther toward the front of the vehicle 30 than the camera unit 10 and the optical axis is parallel to the road. In other words, the virtual camera unit is set such that subjects, such as the pylons and the road, appearing in the taken image are farther away from the camera unit 10, and also such that the optical axis is pointed higher than the camera unit 10.

The viewpoint transformation unit 43 performs the viewpoint transformation that transforms the taken image (the projective transformation image obtained as a result of the projective transformation of the projective transformation unit 42) into a viewpoint transformation image as though taken from the virtual camera unit. The viewpoint transformation of the viewpoint transformation unit 43 can be performed by an affine transformation, for example.

As above, by performing the viewpoint transformation that transforms the taken image into a viewpoint transformation image taken from the virtual camera unit whose optical axis is in agreement with the vanishing point in the viewpoint transformation image, in the viewpoint transformation image, the linearity of subjects that are linear in the real world, such as the lane lines going toward the vanishing point, are preserved as illustrated in FIG. 5, for example. As a result, the discomfort felt by the user looking at the viewpoint transformation image can be suppressed.

Meanwhile, in the present embodiment, there is no depth information about subjects appearing in the projective transformation image, and for this reason, the viewpoint transformation of the projective transformation image is performed by, for example, an affine transformation or the like, without accounting for the positions of subjects in three-dimensional space.

The affine transformation that serves as the viewpoint transformation is performed under the assumption that all subjects appearing in the projective transformation image to be subjected to the viewpoint transformation exist in the plane of the road. For this reason, in the case in which the virtual camera unit is set to a position farther away from the subjects, such as the pylons and the road, appearing in the projective transformation image, in the viewpoint transformation image obtained as a result of the viewpoint transformation of the projective transformation image, standing objects to the left or right at positions distanced from the vanishing point (in the real world, at positions close to the camera unit 10) become collapsed onto the road.

For example, in the viewpoint transformation image illustrated in FIG. 5, the pylons acting as standing objects to the left and right at positions close to the camera unit 10 in the real world are collapsed onto the road more severely than in the case of the taken image before the viewpoint transformation illustrated in FIG. 4.

As above, in the case in which a standing object appears in a collapsed state in the viewpoint transformation image, when the user looks at the viewpoint transformation image, the user may have difficulty recognizing the standing object as a standing object (or a solid object).

Accordingly, in the image processing unit 22 (FIG. 3), the movement transformation unit 44 performs the movement transformation to make it easier for the user to recognize a standing object.

<Movement Transformation of Movement Transformation Unit 44>

FIGS. 6, 7, 8, and 9 are diagrams explaining the movement transformation of the movement transformation unit 44.

Figure 6:
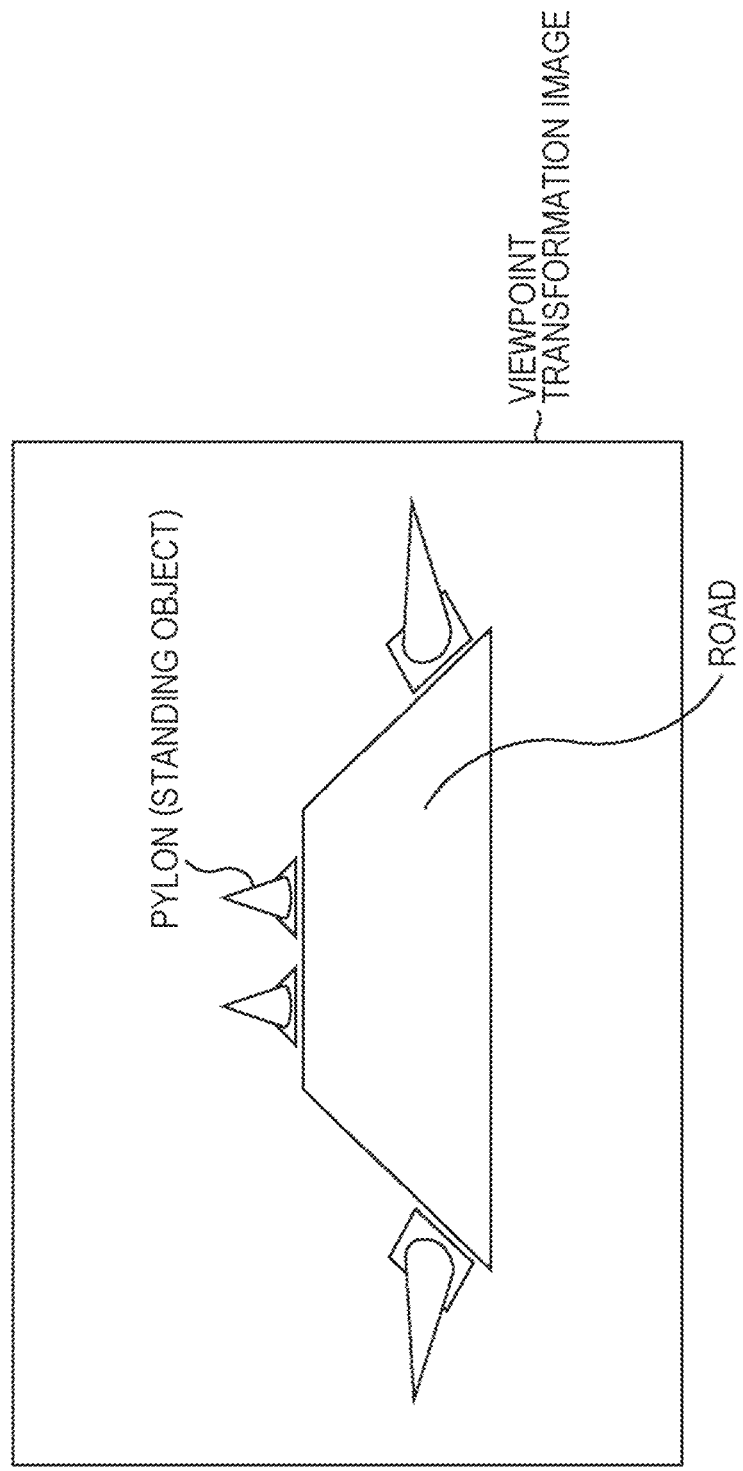
FIG. 6 is a diagram explaining the movement transformation of the movement transformation unit 44.

Namely, FIG. 6 is a diagram illustrating an example of a viewpoint transformation image in which standing objects have become collapsed due to the viewpoint transformation.

In the viewpoint transformation image of FIG. 6, pylons acting as standing objects are placed one by one at respective positions on the left and right sides of the road near the camera unit 10, and two pylons acting as standing objects are placed in a central position deeper into the image.

In the viewpoint transformation image, the pylons acting as standing objects placed at the left and right positions nearby have been collapsed due to the viewpoint transformation, and are displayed in a manner making it difficult to recognize the pylons as standing objects.

Figure 7:
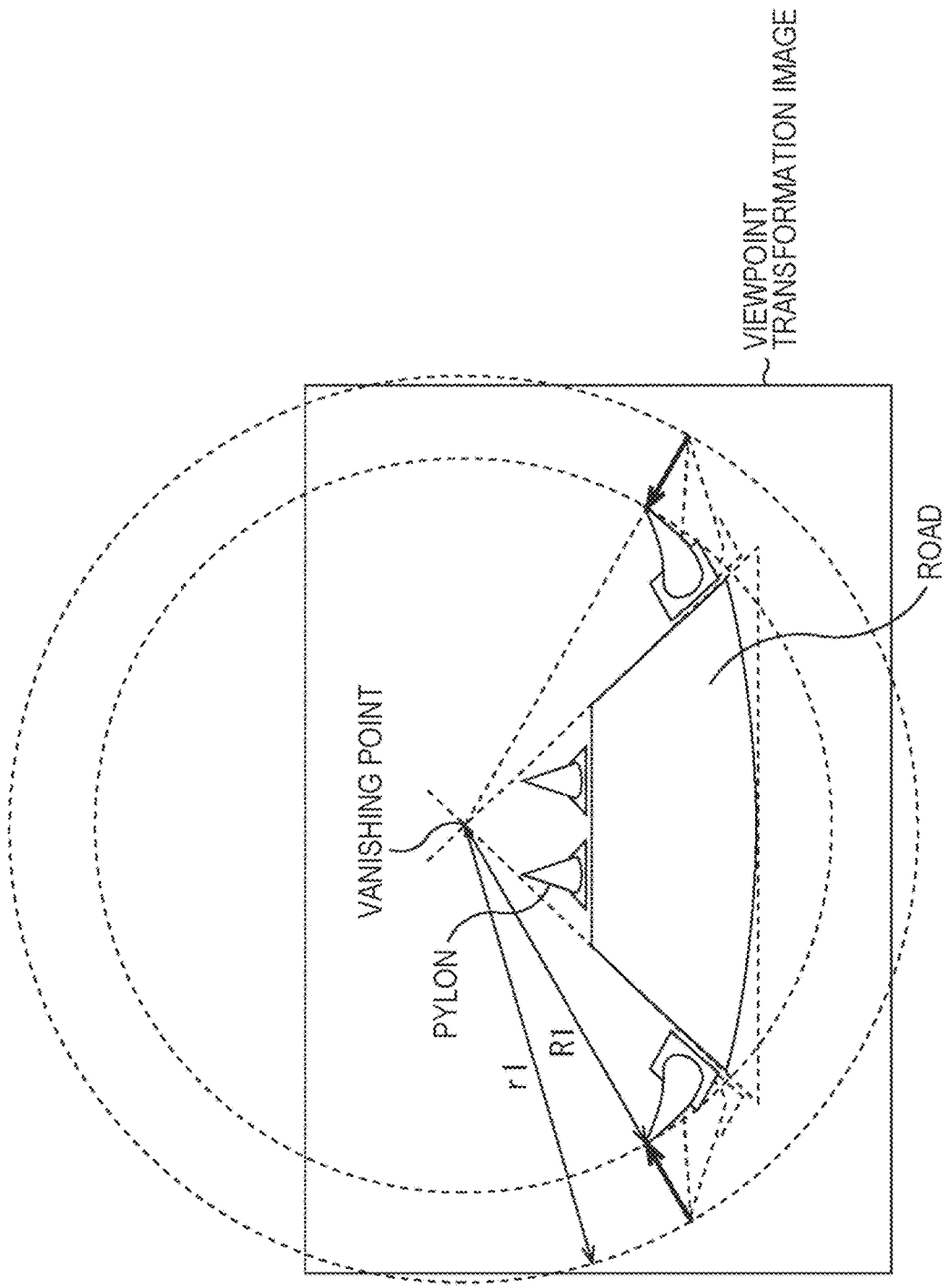
FIG. 7 is a diagram explaining the movement transformation of the movement transformation unit 44.

FIG. 7 is a diagram illustrating an example of movement transformation targeting the viewpoint transformation image of FIG. 6.

In the movement transformation of the movement transformation unit 44, a subject position in the viewpoint transformation image is moved depending on the subject distance from the vanishing point to the subject position where the subject appears in the viewpoint transformation image.

In the viewpoint transformation image of FIG. 7, the subject distance of (the tips of) the pylons acting as standing objects placed at the left and right positions nearby (that is, the distance from the vanishing point to the pylons) is a distance r1.

In FIG. 7, the movement transformation targeting such a viewpoint transformation image causes the subject position of the pylons placed at the left and right positions nearby to be moved according to the subject distance r1 before the movement transformation of the pylons placed at the left and right positions nearby, such that the subject distance after the movement transformation of the pylons becomes a distance R1 that is shorter than the subject distance r1 before the movement transformation.

Herein, in the viewpoint transformation, in the case in which the virtual camera unit is set to a position farther away from the subjects, such as the pylons and the road, appearing in the taken image, in the viewpoint transformation image, standing objects that appear close to the vanishing point (standing objects in the distance away from the virtual camera unit) do not become collapsed, but standing objects appearing at positions distanced from the vanishing point become more collapsed with increasing distance from the vanishing point.

Accordingly, in the movement transformation, for a subject that appears close to the vanishing point, the subject position is not moved, whereas for a subject that appears at a position distanced from the vanishing point, the subject position is moved to approach the vanishing point more closely as the distance from the vanishing point increases.

Figure 8:
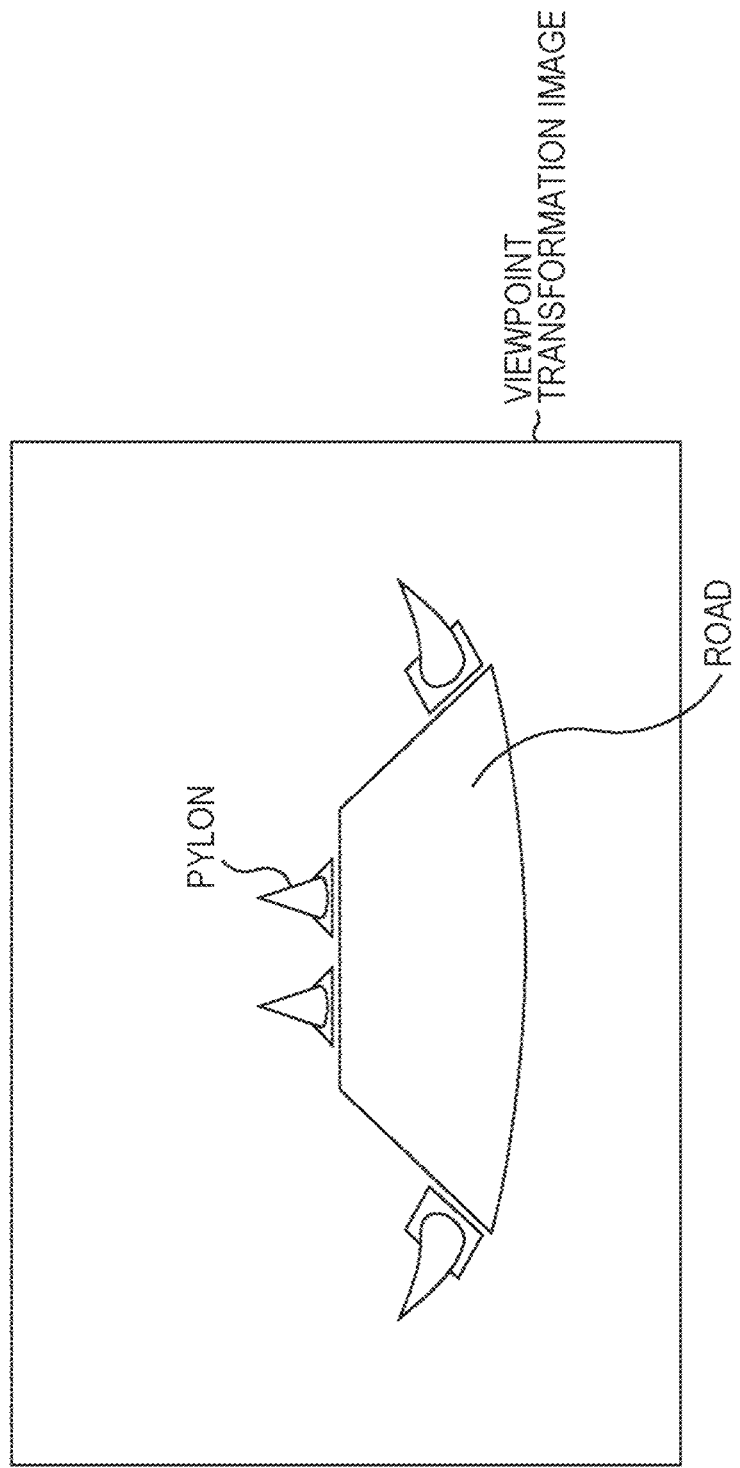
FIG. 8 is a diagram explaining the movement transformation of the movement transformation unit 44.

FIG. 8 is a diagram illustrating an example of a movement transformation image obtained as a result of the movement transformation of the viewpoint transformation image of FIG. 6.

According to the movement transformation, the pylons acting as standing objects placed at the left and right positions nearby that were collapsed due to the viewpoint transformation in the viewpoint transformation image as explained in FIG. 6 become upright as illustrated in FIG. 8.

Consequently, in the movement transformation image obtained as a result of the movement transformation of the viewpoint transformation image, the pylons placed at the left and right positions nearby become easier to recognize as standing objects on the road.

Note that in the movement transformation, the subject position can be moved from a position A to a position B by, for example, changing the pixel values of pixels at the subject position A to the pixel values of pixels at the subject position B.

Also, the movement transformation can be performed in accordance with transformation characteristics expressing a relationship between the subject distance before the movement transformation and the subject distance after the movement transformation.

Figure 9:
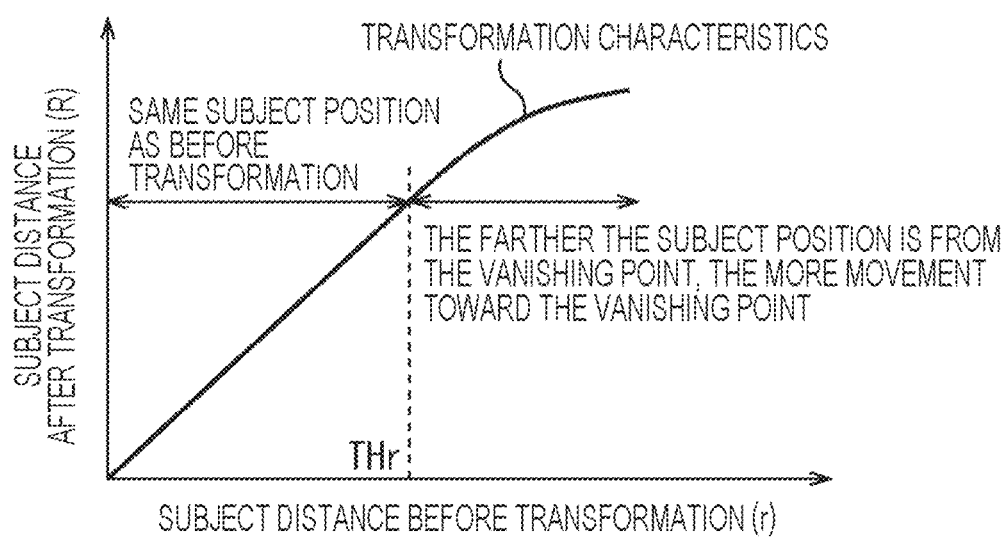
FIG. 9 is a diagram explaining the movement transformation of the movement transformation unit 44.

FIG. 9 is a diagram illustrating an example of the transformation characteristics.

In FIG. 9, the horizontal axis represents the subject distance r before the movement transformation, while the vertical axis represents the subject distance R after the movement transformation.

In the transformation characteristics of FIG. 9, for a case in which the subject distance r before the movement transformation is a threshold value THr or less, the subject distance R after the movement transformation is equal to the subject distance r before the movement transformation, while for a case in which the subject distance r before the movement transformation is greater than the threshold value THr, the subject distance R after the movement transformation is shorter than the subject distance r before the movement transformation.

According to the transformation characteristics of FIG. 9, a subject position whose subject distance r before the movement transformation is the threshold value THr or less is moved such that the subject distance R after the movement transformation becomes equal to the subject distance r before the movement transformation. Consequently, the subject position whose subject distance r before the movement transformation is the threshold value THr or less substantially does not move.

Also, according to the transformation characteristics of FIG. 9, a subject position whose subject distance r before the movement transformation exceeds the threshold value THr is moved toward the vanishing point according to the subject distance r, such that the subject distance R after the movement transformation becomes shorter than the subject distance r before the movement transformation.

In other words, a subject position whose subject distance r before the movement transformation exceeds the threshold value THr is moved according to the subject distance r such that the degree to which (the distance by which) the subject position approaches the vanishing point is large to the extent that the subject distance r is large.

Figure 10:
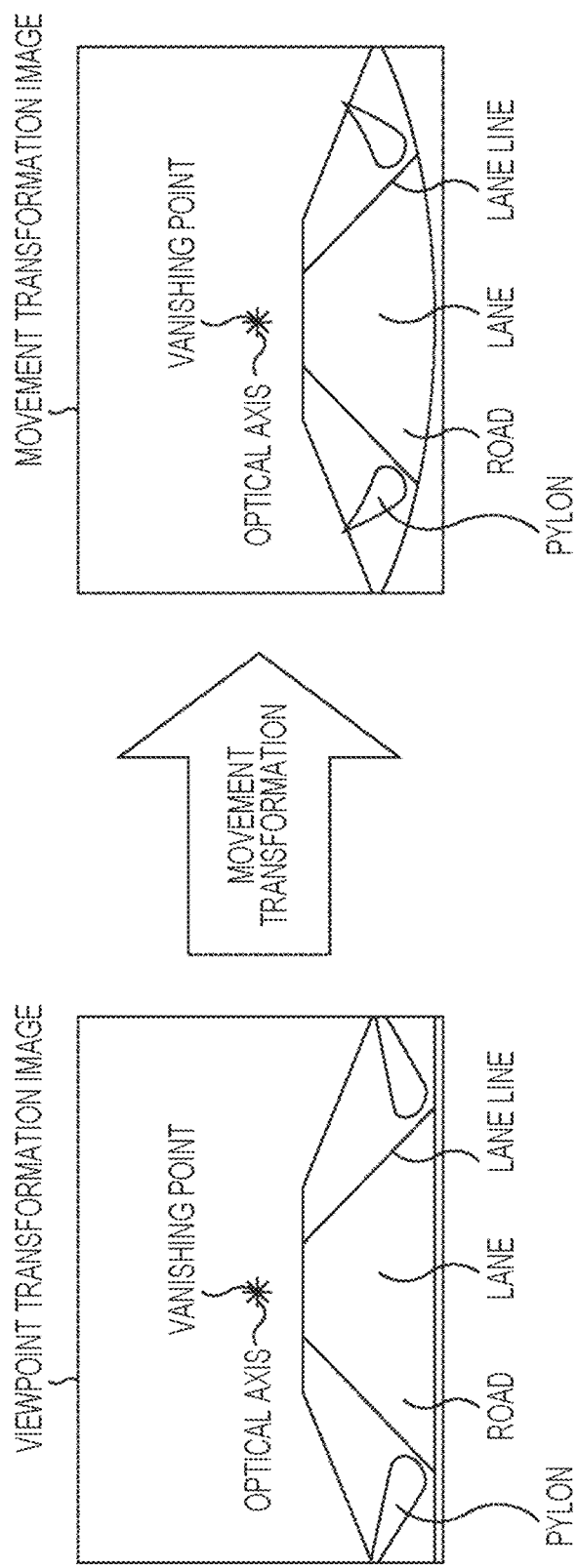
FIG. 10 is a diagram illustrating an example of a movement transformation image obtained as a result of the movement transformation of the viewpoint transformation image illustrated.

FIG. 10 is a diagram illustrating an example of a movement transformation image obtained as a result of the movement transformation of the viewpoint transformation image illustrated in FIG. 5.

As explained in FIG. 5, in the viewpoint transformation image, pylons acting as standing objects to the left and right at positions close to the camera unit 10 are collapsed onto the road.

By performing the movement transformation on such a viewpoint transformation image in accordance with, for example, the transformation characteristics in FIG. 9, a movement transformation image can be obtained in which the pylons that were collapsed onto the road in the viewpoint transformation image are in an upright state, as illustrated in FIG. 10.

<Switching Transformation Characteristics>

FIG. 11 is a diagram explaining an example of switching the transformation characteristics to use in the movement transformation.

As explained in FIG. 3, the switching unit 45 is capable of reading out transformation characteristics from the settings storage memory 23 according to a user operation or the like and switching the transformation characteristics to be supplied to the movement transformation unit 44, for example.

In FIG. 11, first characteristics and second characteristics have been prepared as the transformation characteristics.

In the first characteristics serving as the transformation characteristics, the subject distance R after the movement transformation is equal to the subject distance r before the movement transformation. Consequently, in the movement transformation obeying the first characteristics, because a subject position is moved to that subject position, the subject position substantially does not move.

In the second characteristics serving as the transformation characteristics, similarly to the transformation characteristics of FIG. 9, in the case where the subject distance r before the movement transformation is a threshold value THr or less, the subject distance R after the movement transformation is equal to the subject distance r before the movement transformation, while in the case where the subject distance r before the movement transformation is greater than the threshold value THr, the subject distance R after the movement transformation is shorter than the subject distance r before the movement transformation.

According to the movement transformation obeying the first characteristics, a movement transformation image similar to the viewpoint transformation image, that is, a movement transformation image in which the pylons acting as standing objects remain collapsed due to the viewpoint transformation as illustrated in FIG. 11 can be obtained.

According to the movement transformation obeying the second characteristics, a movement transformation image in which the pylons acting as standing objects that were collapsed due to the viewpoint transformation are in an upright state as illustrated in FIG. 11 can be obtained.

Note that besides using first and second characteristics as the transformation characteristics to be switched by the switching unit 45, characteristics in which the threshold value THr is different from the second characteristics or characteristics in which the relationship between the subject distances r and R at the threshold value THr and beyond is different from the second characteristics (characteristics in which the relationship between the subject distances r and R at the threshold value THr and beyond becomes steeper or gentler than the second characteristics) can be adopted.

By switching the transformation characteristics, in the movement transformation image obtained as a result of the movement transformation, the degree to which standing objects that have been collapsed due to the viewpoint transformation are to be raised upright can be adjusted.

The transformation characteristics may also be adjusted before the car having the onboard camera system according to an embodiment of the present invention is shipped (at a factory) or sold (at a dealership). Also, it may be configured such that the transformation characteristics are adjustable by a user of the car after the car is sold. In the case in which a user of the car adjusts the transformation characteristics, the adjusted values may be saved for each user, and a process of appropriately reading out the adjusted values according to the user may be performed.

Herein, according to the switching of the transformation characteristics, it is possible not only to adjust the degree to which standing objects are to be raised upright in the movement transformation image, but also to adjust the angle of view of the range appearing in the movement transformation image.

In other words, for example, in the case of switching between the first and second characteristics described above, because a subject position that is within the threshold value THr from the vanishing point substantially does not move by either of the first and second characteristics, a region within a circle of radius THr centered on the vanishing point looks the same in the movement transformation image.

On the other hand, in the viewpoint transformation image, a subject position exceeding the threshold value THr from the vanishing point substantially does not move by the first characteristics, but is moved by the second characteristics in the direction of the vanishing point to the extent that the subject distance r is far.

Consequently, for a region outside the circle of radius THr centered on the vanishing point, the range appearing in the region changes between the movement transformation image obtained as a result of the movement transformation obeying the first characteristics and the movement transformation image obtained as a result of the movement transformation obeying the second characteristics.

In other words, by the first characteristics, the subject position does not move, whereas by the second characteristics, the subject position is moved in the direction of the vanishing point to the extent that the subject distance r is far, and therefore a range with a wider angle of view than the movement transformation image obtained as a result of the movement transformation obeying the first characteristics appears in the movement transformation image obtained as a result of the movement transformation obeying the second characteristics.

Consequently, by switching the transformation characteristics, the angle of view of the range appearing in the movement transformation image can be switched (adjusted).

<Process by Image Processing System>

Figure 12:
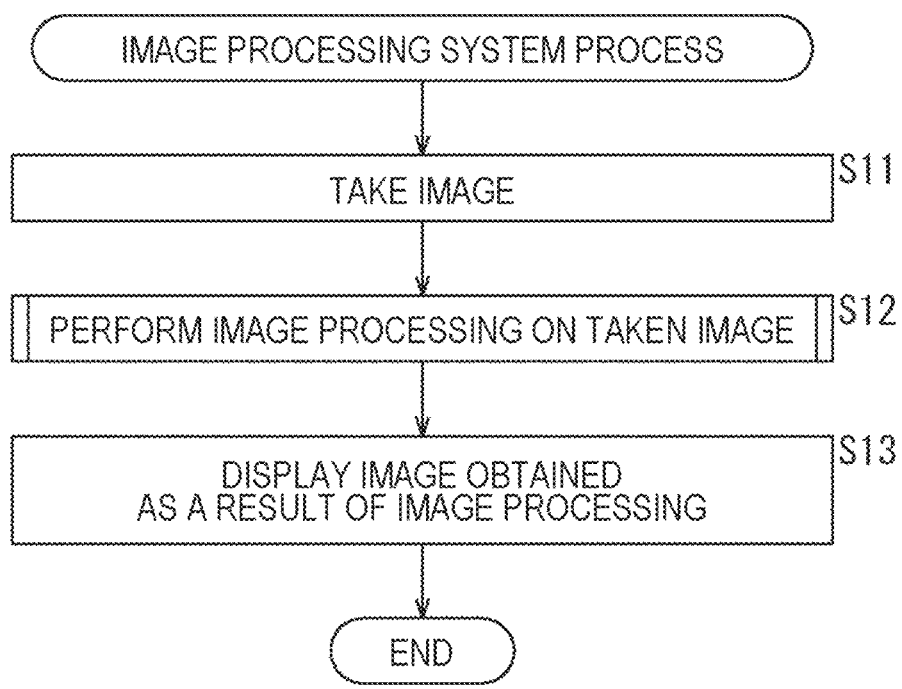
FIG. 12 is a flowchart explaining an example of a process by the image processing system.

FIG. 12 is a flowchart explaining an example of a process by the image processing system of FIG. 1.

In step S11, the camera unit 10 takes an image and supplies the taken image to the image processing unit 22, and the process proceeds to step S12.

In step S12, the image processing unit 22 acquires the taken image from the camera unit 10 and performs image processing on the taken image. Subsequently, the image processing unit 22 supplies an image obtained as a result of the image processing to the output image unit 24, and the process proceeds from step S12 to step S13.

In step S13, the output image unit 24 outputs the processed image from the image processing unit 22 to the display unit 25, thereby causing the display unit 25 to display the image, and the process ends.

Figure 13:
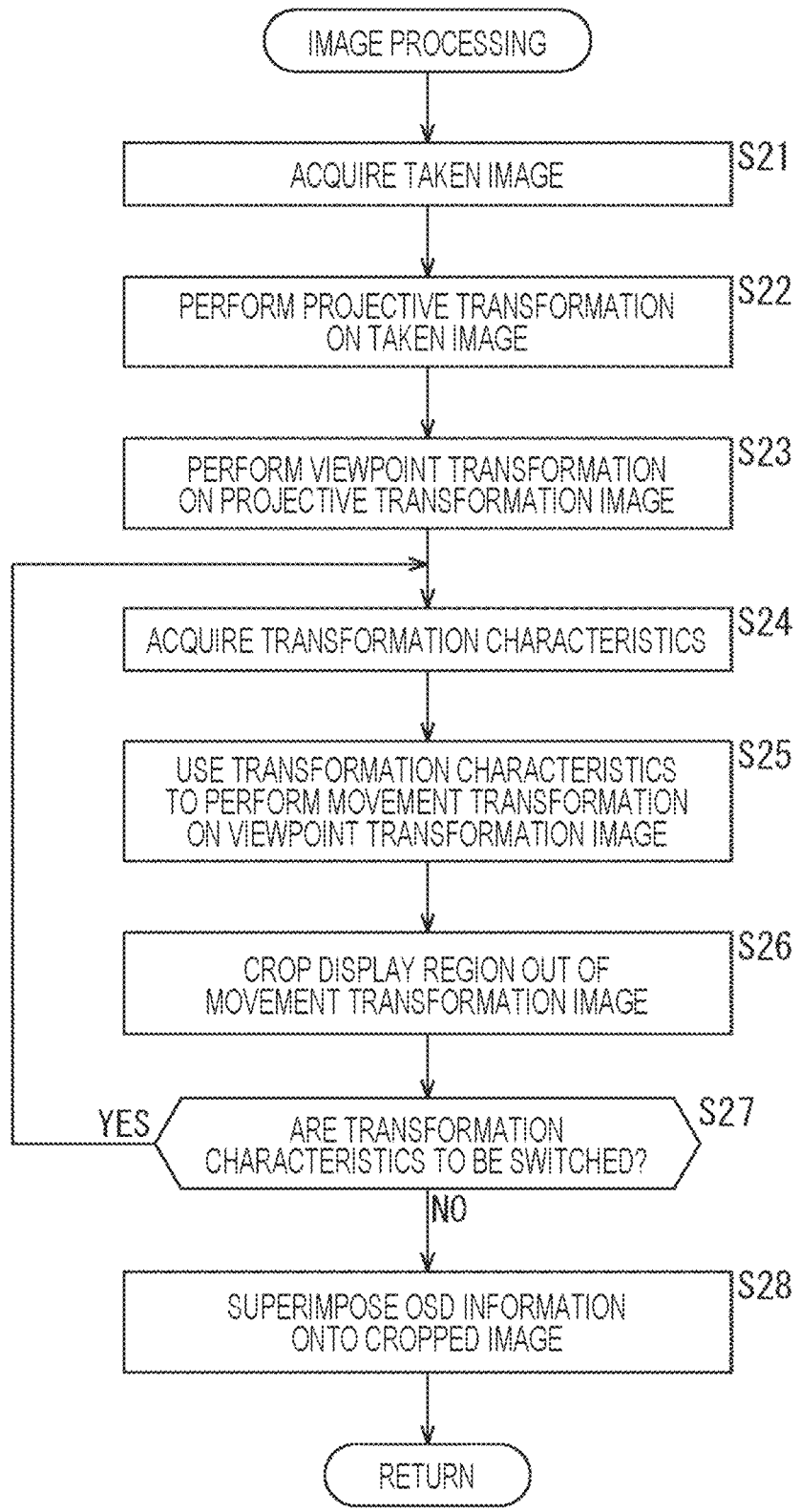
FIG. 13 is a flowchart explaining an example of the image processing in step S12.

FIG. 13 is a flowchart explaining an example of the image processing in step S12 of FIG. 12.

In step S21, the image acquisition unit 41 acquires a taken image supplied from the camera unit 10 as a target image to be subjected to image processing, supplies the acquired target image to the projective transformation unit 42, and the process proceeds to step S22.

In step S22, the projective transformation unit 42 performs a projective transformation of the taken image, treated as the target image, from the image acquisition unit 41, supplies the viewpoint transformation unit 43 with the projective transformation image obtained as a result of the projective transformation. Then, the process proceeds to step S23.

In step S23, the viewpoint transformation unit 43 sets (assumes) a virtual camera unit, and performs a viewpoint transformation on the projective transformation image from the projective transformation unit 42 such that the optical axis of the virtual camera unit coincides with the vanishing point in the viewpoint transformation image. Subsequently, the viewpoint transformation unit 43 supplies to the movement transformation unit 44 with the viewpoint transformation image obtained as a result of the viewpoint transformation of the projective transformation image, and the process proceeds from step S23 to step S24.

In step S24, the switching unit 45 acquires transformation characteristics from the settings storage memory 23, supplies the acquired transformation characteristics to the movement transformation unit 44. Then, the process proceeds to step S25.

In step S25, the movement transformation unit 44 performs movement transformation on the viewpoint transformation image from the viewpoint transformation unit 43 in accordance with the transformation characteristics supplied from the switching unit 45 in the preceding step S24 (that is, in accordance with the most recent transformation characteristics). Subsequently, the movement transformation unit 44 supplies the display region cropping unit 46 with the movement transformation image obtained as a result of the movement transformation of the viewpoint transformation image. Then, the process proceeds from step S25 to step S26.

In step S26, the display region cropping unit 46 crops an image of a display region to be displayed on the display unit 25 from the movement transformation image from the movement transformation unit 44 as a cropped image. Subsequently, the display region cropping unit 46 supplies the cropped image to the superimposing unit 47. Then, the process proceeds from step S26 to step S27.

In step S27, the switching unit 45 determines whether or not to switch the transformation characteristics used in the movement transformation.

In step S27, in the case of determining to switch the transformation characteristics used in the movement transformation, that is, in the case where the operation unit 21 is operated to switch the transformation characteristics, for example, the process returns to step S24.

In step S24, the switching unit 45 newly acquires transformation characteristics different from the transformation characteristics acquired previously from the settings storage memory 23, supplies the newly acquired transformation characteristics to the movement transformation unit 44. Thereafter, a similar process is repeated.

Herein, by supplying to the movement transformation unit 44 with the transformation characteristics newly acquired by the switching unit 45 as described above, the transformation characteristics used in the movement transformation are switched.

On the other hand, in step S27, in the case of determining not to switch the transformation characteristics used in the movement transformation, that is, in the case where the operation unit 21 is not operated to switch the transformation characteristics, for example, the process proceeds to step S28.

In step S28, the superimposing unit 47 superimposes OSD information, as necessary, onto the cropped information from the display region cropping unit 46, and supplies the superimposed image to the output image unit 24. Then, the process returns to the parent process. Note that the projective transformation in step S22, the viewpoint transformation in step S23, the acquisition of transformation characteristics and the movement transformation using the transformation characteristics in steps S24 and S25, and the process of cropping the cropped image (the image of the display region) in step S26 may be performed in any order, and all of these processes may also be performed at once as a comprehensive process.

<Viewpoint Transformation and Appearance of Images>

Figure 14:
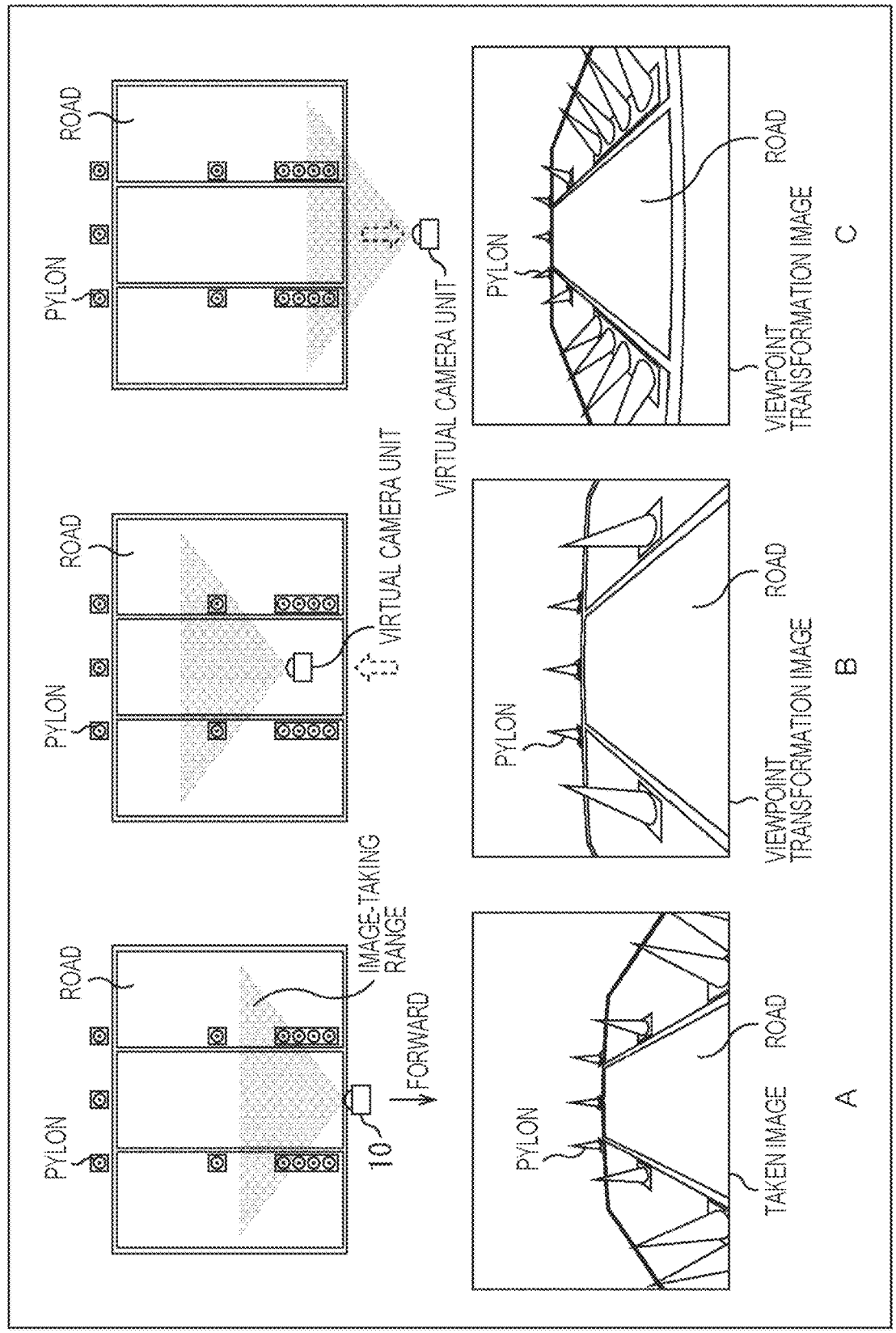
FIG. 14 is a diagram illustrating an example of the viewpoint transformation and the appearance of images.

FIG. 14 is a diagram illustrating an example of the viewpoint transformation and the appearance of images.

Namely, FIG. 14 illustrates an example of taken images taken according to the central projection method and viewpoint transformation images obtained as a result of the viewpoint transformation of the taken images.

A of FIG. 14 illustrates an example of (a plan view expressing) image-taking conditions in the case where the camera unit 10 takes an image according to the central projection method, and a taken image taken by the camera unit 10. Note that the diagrams illustrating image-taking conditions in FIG. 14 are plan views.

In A of FIG. 14, an image of a road on which pylons acting as standing objects have been placed is taken according to the central projection method, and a taken image in which the road and the pylons placed on the road appear is obtained.

B of FIG. 14 illustrates an example of the image-taking conditions in the case of setting the virtual camera unit to a position closer to the subjects (pylons) (in the present embodiment, the rearward direction of the vehicle 30), and a viewpoint transformation image obtained as a result of the viewpoint transformation of the taken image in the case in which the virtual camera unit is set to a position closer to the subjects.

In the case in which the virtual camera unit is set to a position closer to the subjects, as illustrated in the viewpoint transformation image in B of FIG. 14, the pylons at positions distanced from the vanishing point become collapsed inward (toward the vanishing point).

C of FIG. 14 illustrates an example of the image-taking conditions in the case of setting a virtual camera unit to a position farther away from the subjects (in the present embodiment, the forward direction of the vehicle 30), and a viewpoint transformation image obtained as a result of the viewpoint transformation of the taken image in the case in which the virtual camera unit is set to a position farther away from the subjects.

In the case in which the virtual camera unit is set to a position farther away from the subjects, as illustrated in the viewpoint transformation image in C of FIG. 14, the pylons at positions distanced from the vanishing point become collapsed outward (the opposite direction going away from the vanishing point).

Figure 15:
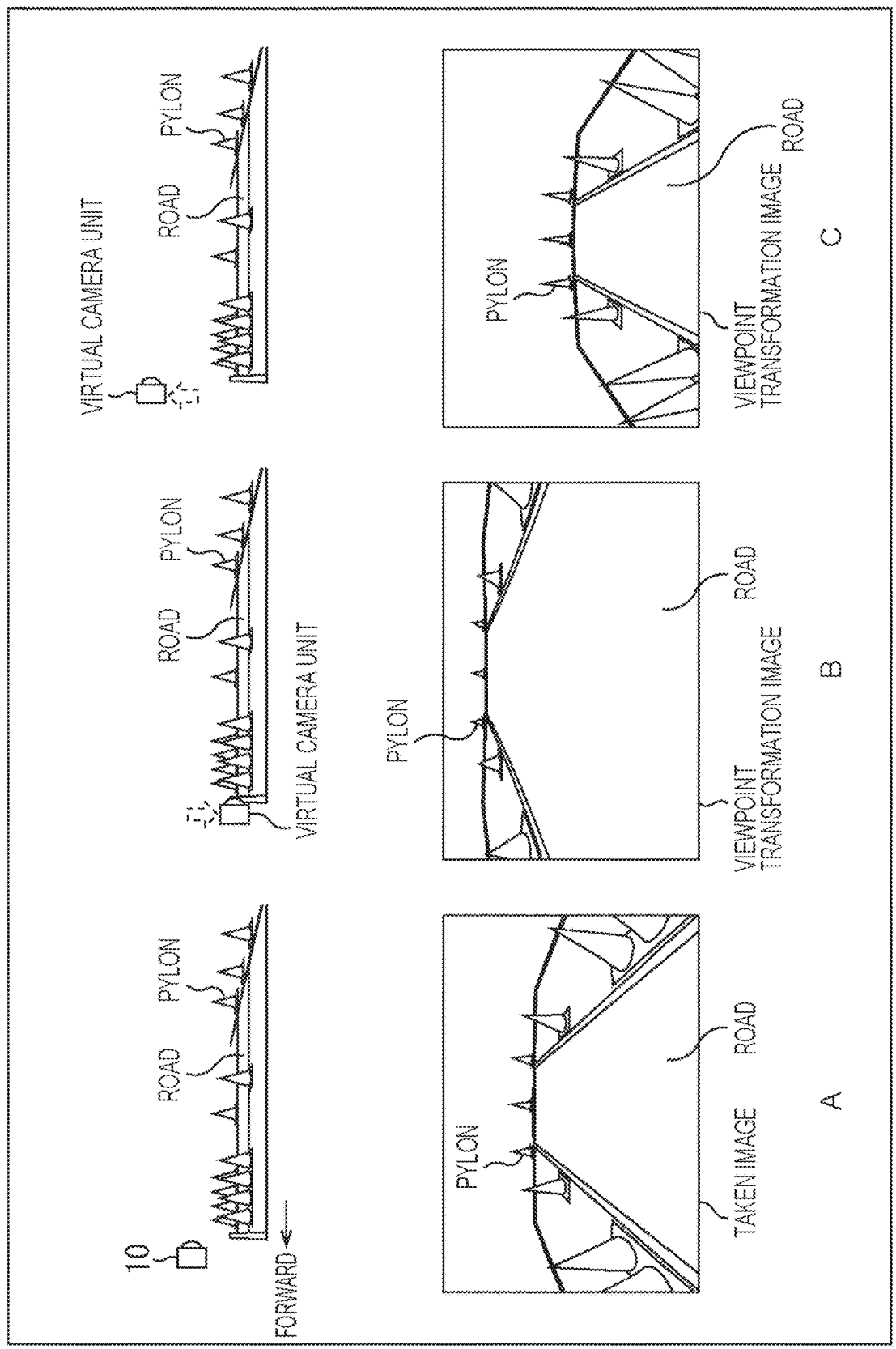
FIG. 15 is a diagram illustrating another example of the viewpoint transformation and the appearance of images.

FIG. 15 is a diagram illustrating another example of the viewpoint transformation and the appearance of images.

Namely, FIG. 15 illustrates another example of taken images taken according to the central projection method and viewpoint transformation images obtained as a result of the viewpoint transformation of the taken images.

A of FIG. 15 illustrates an example of (a side view expressing) image-taking conditions in the case where the camera unit 10 takes an image according to the central projection method, and a taken image taken by the camera unit 10. Note that the diagrams illustrating image-taking conditions in FIG. 15 are side views of the image-taking conditions from the left side when facing in the forward direction of the vehicle 30.

In A of FIG. 15, similarly to the case in A of FIG. 14, an image of a road on which pylons acting as standing objects have been placed is taken according to the central projection method, and a taken image in which the road and the pylons placed on the road appear is obtained.

B of FIG. 15 illustrates an example of the image-taking conditions in the case of setting the virtual camera unit to a position moved downward from the camera unit 10 (in the present embodiment, the direction approaching the road), and a viewpoint transformation image obtained as a result of the viewpoint transformation of the taken image in the case in which the virtual camera unit is set to a position moved downward.

In the case in which the virtual camera unit is set to a position moved downward, as illustrated in the viewpoint transformation image in B of FIG. 15, the pylons at positions distanced from the vanishing point become collapsed inward (slightly).

C of FIG. 15 illustrates an example of the image-taking conditions in the case of setting the virtual camera unit to a position moved upward from the camera unit 10 (in the present embodiment, the direction going away from the road), and a viewpoint transformation image obtained as a result of the viewpoint transformation of the taken image in the case in which the virtual camera unit is set to a position moved upward.

In the case in which the virtual camera unit is set to a position moved upward, as illustrated in the viewpoint transformation image in C of FIG. 15, the pylons at positions distanced from the vanishing point become collapsed outward (slightly).

Figure 16:
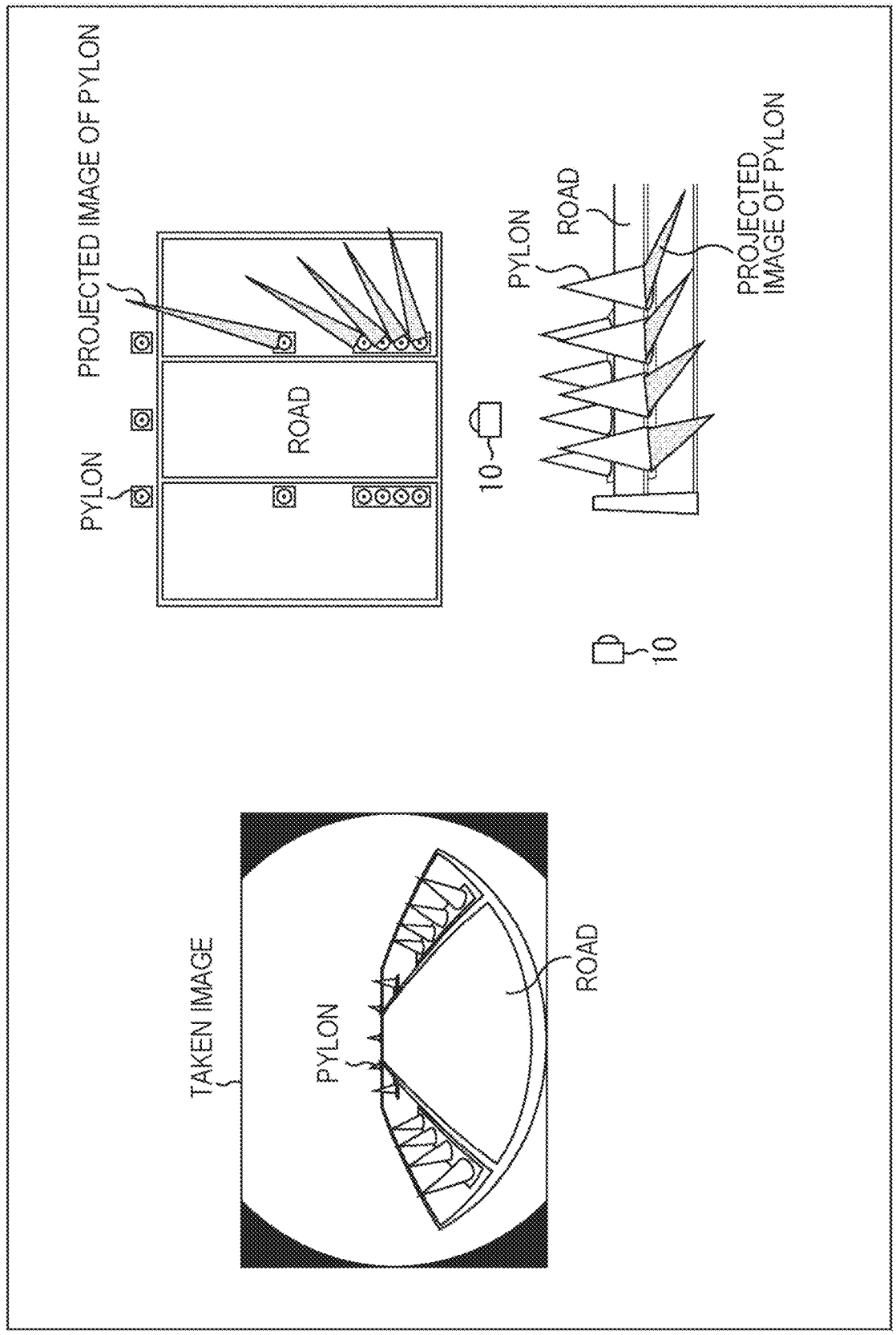
FIG. 16 is a diagram explaining pylons acting as standing objects that appear in a taken image.

FIG. 16 is a diagram explaining pylons acting as standing objects that appear in a taken image.

FIG. 16 illustrates an example of image-taking conditions in the case of taking an image of a road on which pylons acting as standing objects have been placed, and a taken image obtained by such image-taking. Note that in FIG. 16, a plan view and a side view of the image-taking conditions from the left side when facing in the forward direction of the vehicle 30 are illustrated as the diagrams illustrating the image-taking conditions.

With just a single taken image in which pylons acting as standing objects standing up on the road appear, it cannot be determined whether the pylons appearing in the taken image are standing objects placed on the road or projected images of the pylons acting as standing objects projected onto the road.

In other words, a similar taken image is obtained regardless of whether an image of a road, on which pylons acting as standing objects have been placed, is taken or an image of a road, on which projected images of pylons have been drawn, is taken.

Figure 17:
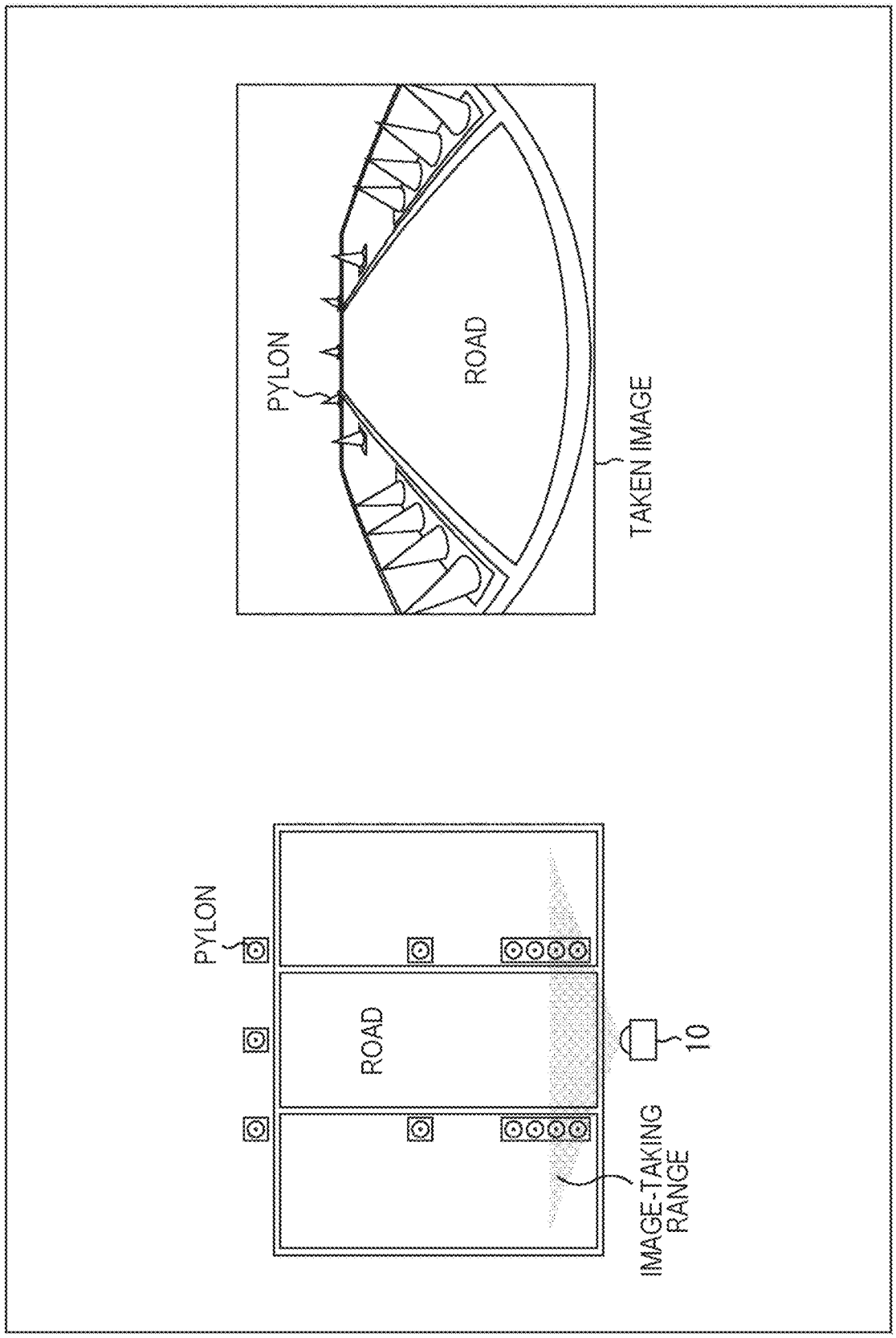
FIG. 17 is a diagram illustrating an example of an image-taking range and a taken image taken by the camera unit 10 according to the equidistant projection method.

FIG. 17 is a diagram illustrating an example of an image-taking range and a taken image taken by the camera unit 10 according to the equidistant projection method.

In order for the neighborhood of the vehicle 30 (which is also the neighborhood of the camera unit 10) to be contained in the angle of view of the taken image, a wide-angle lens of the equidistant projection method, such as a fisheye lens for example, is adopted in the camera unit 10.

With the equidistant projection method, a taken image having a wide angle of view can be taken, but subjects appearing in the taken image become distorted due to the equidistant projection method. For example, lanes which are straight become curved.

Furthermore, in the taken image of the equidistant projection method, as illustrated in FIG. 17, a subject (for example, a pylon) in the neighborhood of the vehicle 30 appears larger, but in the case of a subject distant from the vehicle 30, as the subject becomes more distant from the vehicle 30, the subject appears smaller than its actual appearance.

Consequently, with a taken image of the equidistant projection, it may be difficult to grasp a sense of distance to subjects appearing in the taken image.

Accordingly, in the image processing unit 22, the projective transformation and the viewpoint transformation are performed.

Figure 18:
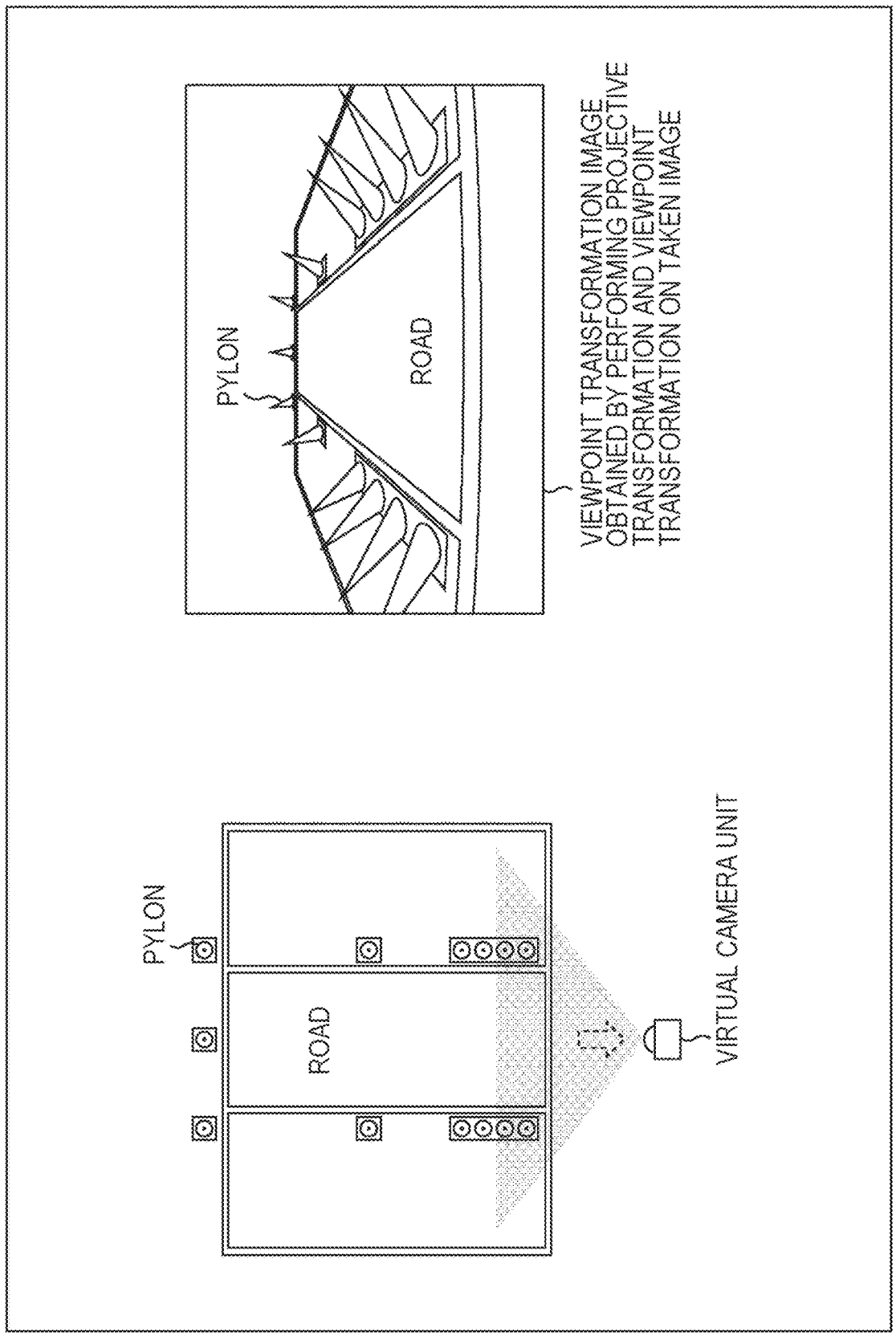
FIG. 18 is a diagram illustrating an example of a viewpoint transformation image obtained as a result of the projective transformation and the viewpoint transformation of the taken image, and the setting of the virtual camera unit performed in the viewpoint transformation.

FIG. 18 is a diagram illustrating an example of a viewpoint transformation image obtained as a result of the projective transformation and the viewpoint transformation of the taken image in FIG. 17, and the setting of the virtual camera unit performed in the viewpoint transformation.

In the projective transformation, the taken image of the equidistant projection method is transformed into a projective transformation image of the central projection method, thereby correcting the distortion of subjects appearing in the taken image.

In the viewpoint transformation, in order for subjects in the neighborhood of the vehicle 30 to be contained in the angle of view, as illustrated by the dashed arrow in the diagram, the virtual camera unit is set to a position farther away from the subjects, or in other words, farther in the forward direction of the vehicle 30 than the position of the camera unit 10 in FIG. 17, and the viewpoint transformation image is computed.

According to the above, distortion caused by the equidistant projection method can be corrected, and in addition, a viewpoint transformation image in which subjects in the neighborhood of the vehicle 30 appear can be obtained.

However, in the case in which the virtual camera unit is set to a position farther away from the subjects in the viewpoint transformation, in the viewpoint transformation image obtained as a result of the viewpoint transformation, the pylons acting as standing objects positioned in the neighborhood of the vehicle 30 in particular become collapsed outward, as illustrated in C of FIG. 14.

In other words, as explained in FIG. 16, from the taken image alone, it cannot be determined whether the pylons appearing in the taken image are standing objects placed on the road or projected images of the pylons acting as standing objects projected onto the road.

Additionally, the transformation used as the viewpoint transformation of the taken image (projective transformation image), such as the affine transformation for example, is performed under the assumption that the pylons appearing in the taken image are projected images of the pylons.

For this reason, the pylons appearing in the viewpoint transformation image obtained as a result of the viewpoint transformation are in a collapsed state.

Figure 19:
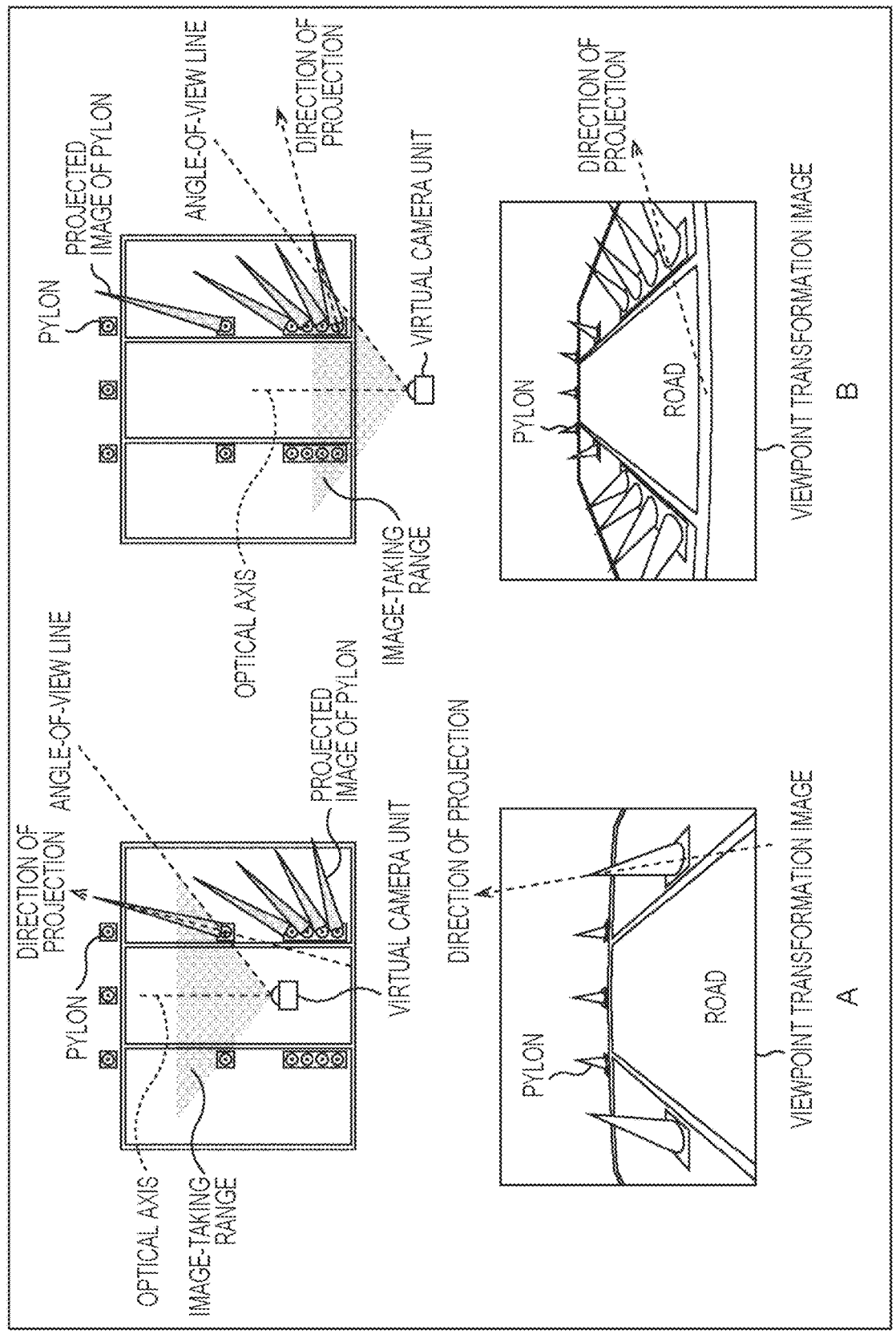
FIG. 19 is a diagram explaining the collapse directions of the pylons appearing in the viewpoint transformation image.

FIG. 19 is a diagram explaining the collapse directions of the pylons appearing in the viewpoint transformation image.

A of FIG. 19 is a diagram explaining the case in which the pylons appearing in the viewpoint transformation image collapse inward (toward the vanishing point). Namely, A of FIG. 19 is a diagram illustrating a plan view illustrating the image-taking conditions and an example of the viewpoint transformation image.

As illustrated in A of FIG. 19, in the viewpoint transformation, with respect to angle-of-view lines that express the boundary of the image-taking range of the virtual camera unit, if the direction of the projection of pylons appearing in the taken image is pointed in the inward direction of the angle-of-view lines (toward the optical axis of the virtual camera unit) (that is, in the case in which the direction of the projection of the pylons does not stick out beyond the angle of view), the pylons become collapsed inward in the viewpoint transformation image.

In the case in which the virtual camera unit is set to a position closer to the subjects, the direction of the projection of pylons with respect to the angle-of-view lines may point in the inward direction of the angle-of-view lines.

B of FIG. 19 is a diagram explaining the case in which the pylons appearing in the viewpoint transformation image collapse outward (the opposite direction going away from the vanishing point). Namely, B of FIG. 19 is a diagram illustrating a plan view illustrating the image-taking conditions and an example of the viewpoint transformation image.

As illustrated in B of FIG. 19, in the viewpoint transformation, with respect to the angle-of-view lines that express the boundary of the image-taking range of the virtual camera unit, if the direction of the projection of pylons appearing in the taken image is pointed in the outward direction of the angle-of-view lines (in the opposite direction going away from the optical axis of the virtual camera unit) (that is, in the case in which the direction of the projection of the pylons sticks out beyond the angle of view), the pylons become collapsed outward in the viewpoint transformation image.

In the case in which the virtual camera unit is set to a position farther away from the subjects, the direction of the projection of pylons with respect to the angle-of-view lines may point in the outward direction of the angle-of-view lines.

Figure 20:
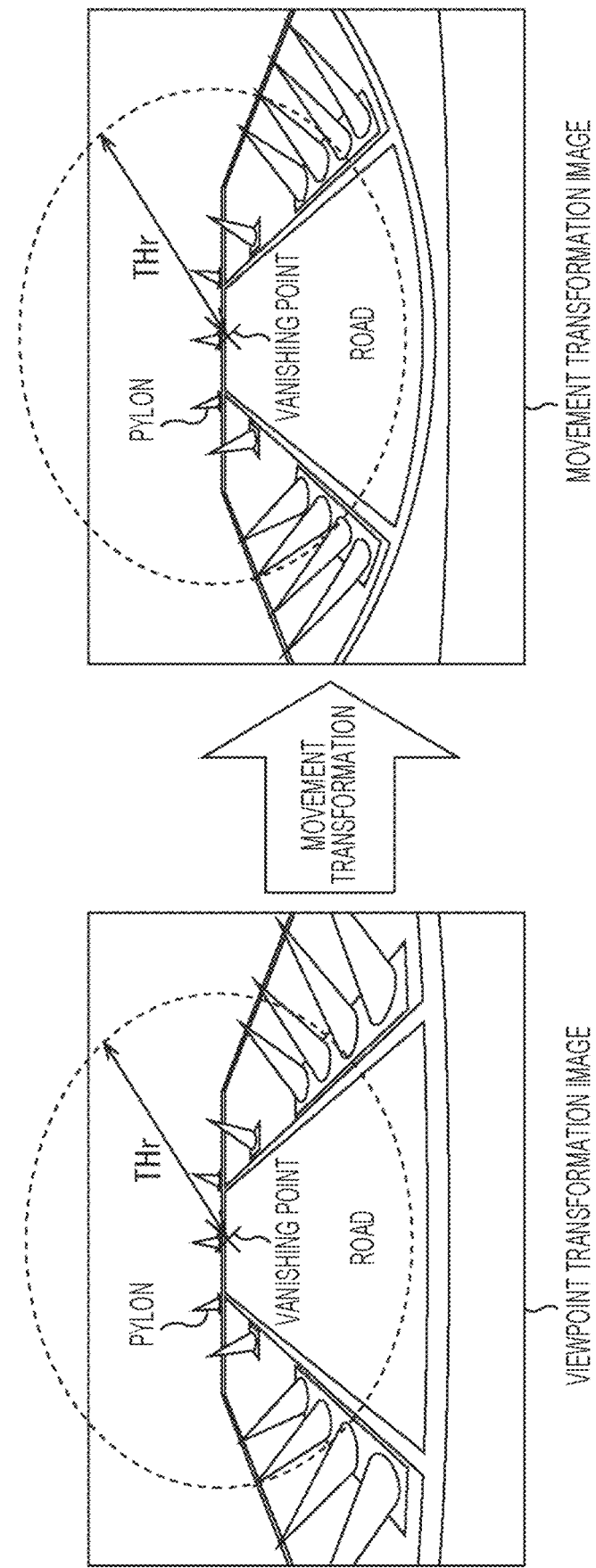
FIG. 20 is a diagram illustrating an example of a viewpoint transformation image to be subjected to the movement transformation, and a movement transformation image obtained as a result of the movement transformation of the viewpoint transformation image.

FIG. 20 is a diagram illustrating an example of a viewpoint transformation image to be subjected to the movement transformation, and a movement transformation image obtained as a result of the movement transformation of the viewpoint transformation image.

In the viewpoint transformation image of FIG. 20, pylons acting as standing objects placed on the road appear in an outwardly collapsed state.

Additionally, the movement transformation is performed on the viewpoint transformation image, a movement transformation image is obtained in which subjects whose subject distance is within the threshold value THr from the vanishing point still appear the same as in the viewpoint transformation image, while subjects whose subject distance exceeds the threshold value THr from the vanishing point are moved closer to the vanishing point.

In the movement transformation image, because the subjects whose subject distance exceeds the threshold value THr from the vanishing point are moved closer to the vanishing point, the pylons what were collapsed outward become more upright than before the movement transformation. Consequently, by the movement transformation image, the standing objects become easier to recognize.

Note that in the movement transformation, by leaving subjects whose subject distance is within the threshold value THr from the vanishing point unchanged, the user can look at the subjects with the distortion due to the projective transformation corrected for the subjects whose subject distance is within the threshold value THr from the vanishing point.

Also, in the present embodiment, by moving the subject positions closer to the vanishing point in the movement transformation, the pylons acting as standing objects that were collapsed outward are put into an upright state. However, in the movement transformation, the subject positions can be otherwise moved, as needed, farther away from the vanishing point depending on the subject distance.

In the movement transformation, in the case of moving the subject positions farther away from the vanishing point, standing objects that were collapsed inward can be put into an upright state.

<Description of Image Transformation Performed by Image Processing Unit 22>

Figure 21:
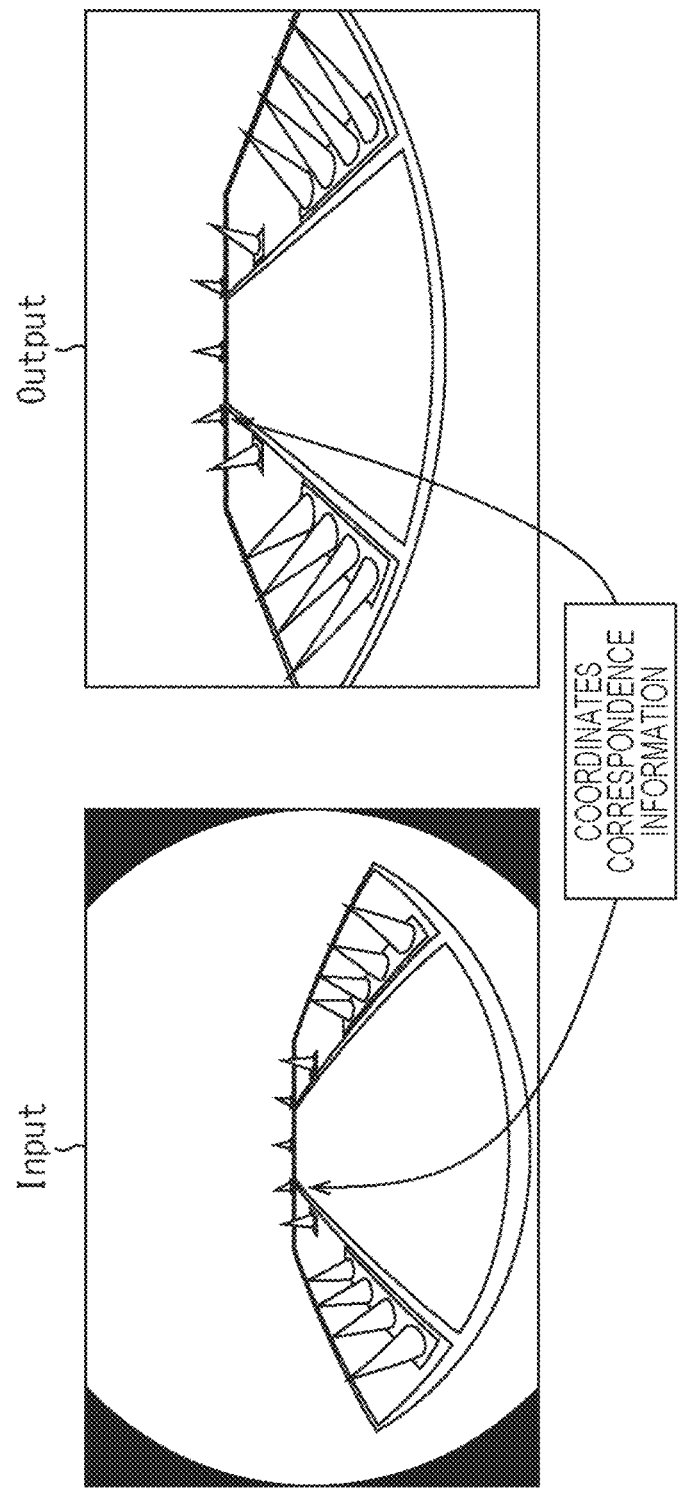
FIG. 21 is a diagram explaining an image transformation performed by the image processing unit 22.

FIG. 21 is a diagram explaining an image transformation performed by the image processing unit 22.

Note that herein, the image transformation means each of the projective transformation, the viewpoint transformation, and movement transformation or a combined transformation of two of more from among the projective transformation, the viewpoint transformation, and the movement transformation performed by the image processing unit 22.

Also, the image to be subjected to the image transformation is also referred to as the input image, while the image obtained as a result of the image transformation of the input image is also referred to as the output image.

In the image transformation, an input image "Input" is transformed into an output image "Output" in accordance with coordinate correspondence information that expresses a point (pixel) at which set of coordinates in the output image "Output" corresponds to a point (pixel) at each set of coordinates in the input image "Input".

The coordinate correspondence information can be stored in the form of a lookup table (LUT) or a numerical formula, for example. In other words, the coordinate correspondence information can be stored in memory (for example, the settings storage memory 23) as the LUT or can be generated according to the numerical formula (computed by mathematical operations) in the image processing unit 22.

Note that in the image transformation, after the input image "Input" is transformed in accordance with the coordinate correspondence information, a cropping process of cropping a part of the transformed image can be performed, and the image after the cropping process can be treated as the output image "Output" obtained as a result of the image transformation.

Figure 22:
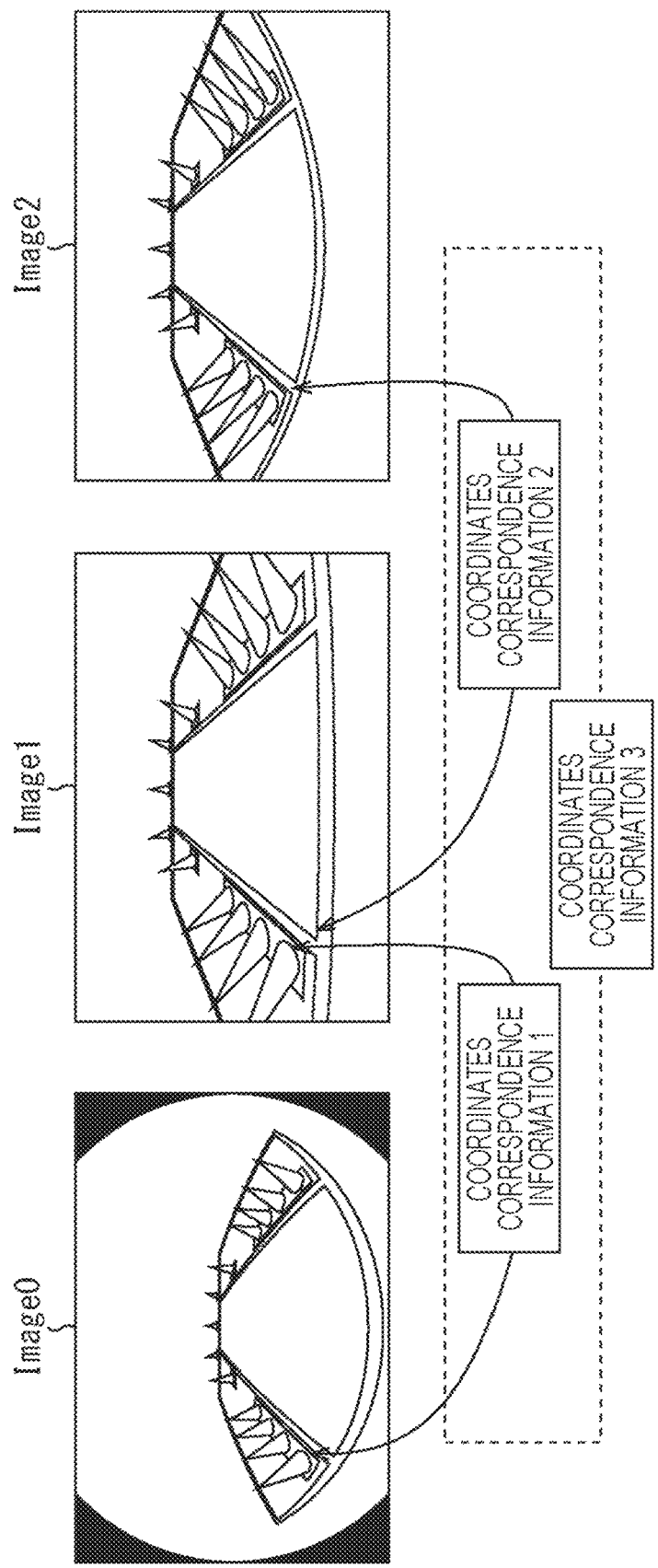
FIG. 22 is a diagram further explaining the image transformation performed by the image processing unit 22.

FIG. 22 is a diagram further explaining the image transformation performed by the image processing unit 22.

In FIG. 22, an image "Image0" is the taken image, and an image "Image1" is the viewpoint transformation image obtained by performing the projective transformation and the viewpoint transformation on the taken image "Image0". Also, an image "image2" is the movement transformation image obtained by performing the movement transformation on the viewpoint transformation image "Image1".

Coordinate correspondence information for transforming the taken image "Image0" into the viewpoint transformation image "Image1" will be referred to as the coordinate correspondence information 1, and in addition, coordinate correspondence information for transforming the viewpoint transformation image "Image1" into the movement transformation image "Image2" will be referred to as the coordinate correspondence information 2.

In the image processing unit 22, the coordinate correspondence information 1 and the coordinate correspondence information 2, or coordinate correspondence information 3 that is a hybrid of the coordinate correspondence information 1 and the coordinate correspondence information 2, can be stored in memory or generated according to a numerical formula, and the taken image "Image0" can be transformed into the movement transformation image "Image2" in accordance with the coordinate correspondence information 1 and the coordinate correspondence information 2 or in accordance with the coordinate correspondence information 3.

Herein, for example, in the case where each of the coordinate correspondence information 1 and the coordinate correspondence information 2 is represented as a matrix, the coordinate correspondence information 3 can be represented by a matrix obtained as the product of the matrix representing the coordinate correspondence information 1 and the matrix representing the coordinate correspondence information 2.

Also, in an actual implementation, the image processing unit 22 does not have to generate the viewpoint transformation image "Image1" from the taken image "Image0" in accordance with the coordinate correspondence information 1, and after that, generate the movement transformation image "Image2" from the viewpoint transformation image "Image1" in accordance with the coordinate correspondence information 2. For example, the image processing unit 22 can generate the movement transformation image "Image2" directly from the taken image "Image0" in accordance with the coordinate correspondence information 3. In this case, the viewpoint transformation image "Image1" is not generated.

Figure 23:
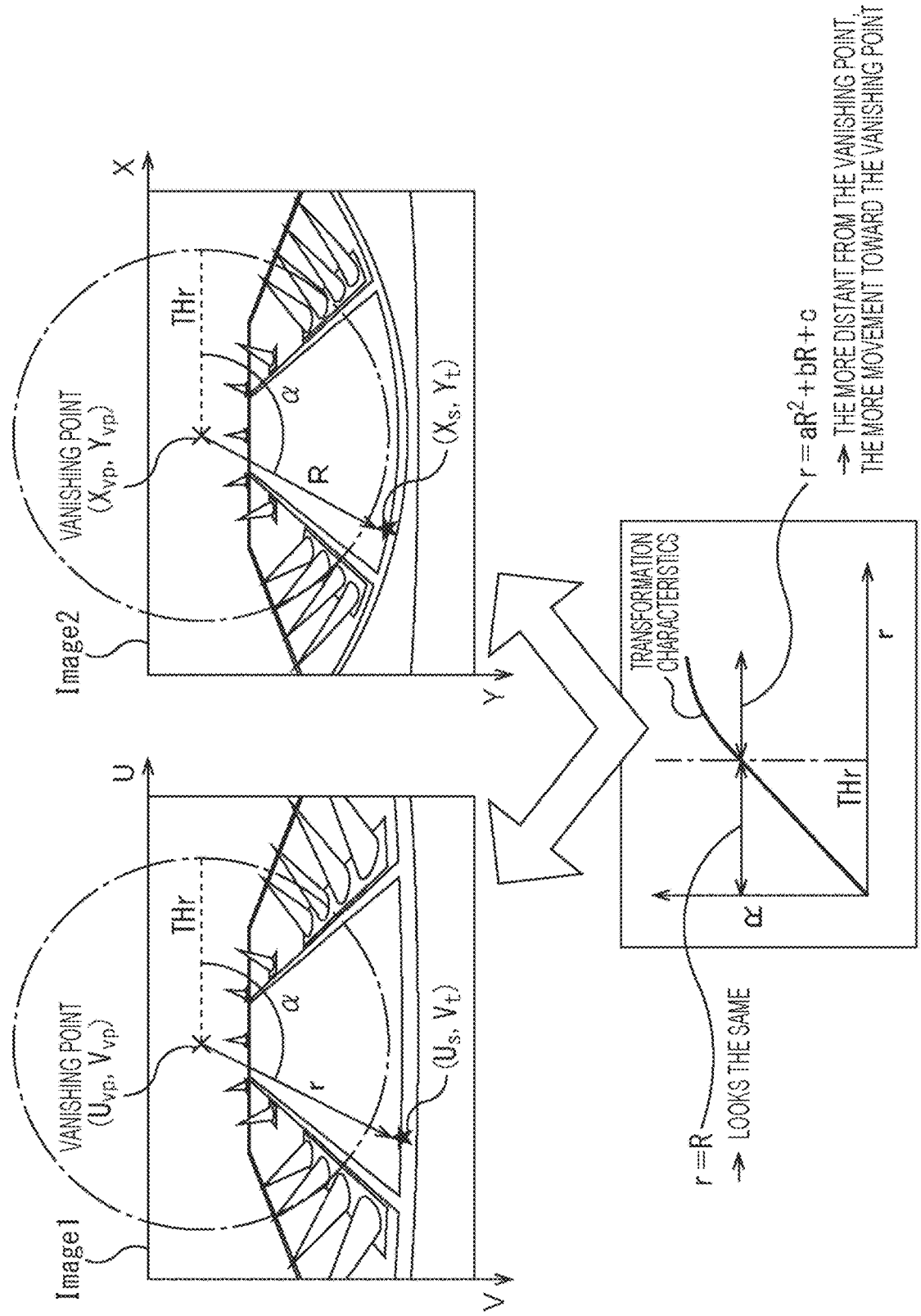
FIG. 23 is a diagram explaining the movement transformation performed by the image processing unit 22.

FIG. 23 is a diagram explaining the movement transformation performed by the image processing unit 22.

Herein, for the viewpoint transformation image "Image1" to be subjected to the movement transformation, the coordinates of each point (pixel) in the viewpoint transformation image "Image1" are expressed by a two-dimensional coordinate system in which the upper-left point is defined to be the origin, the horizontal axis is defined to be a U axis, and the vertical axis is defined to be a V axis.

Also, for the movement transformation image "Image2" obtained as a result of the movement transformation of the viewpoint transformation image "Image1", the coordinates of each point (pixel) in the movement transformation image "Image2" are expressed by a two-dimensional coordinate system in which the upper-left point is defined to be the origin, the horizontal axis is defined to be an X axis, and the vertical axis is defined to be a Y axis.

Here, let $(U_{vp}, V_{vp})$ be the coordinates of the vanishing point in the viewpoint transformation image "Image1", and let $(U_s, V_t)$ be (the coordinates of) a point a distance (subject distance) r away from the vanishing point $(U_{vp}, V_{vp})$ in the direction of a counter-clockwise angle α obtained by treating the U-axis direction as the basis (0 degrees).

Similarly, let $(X_{vp}, Y_{vp})$ be the coordinates of the vanishing point in the movement transformation image "Image2", and let $(X_s, Y_t)$ be a point a distance R away from the vanishing point $(X_{vp}, Y_{vp})$ in the direction of a counter-clockwise angle α obtained by treating the X-axis direction as the basis.

In the movement transformation, the point $(U_s, V_t)$ of the viewpoint transformation image "Image1" is transformed into the point $(X_s, Y_t)$ of the movement transformation image "Image2". In this way, in the movement transformation, the relationship in which the point $(U_s, V_t)$ is transformed into the point $(X_s, Y_t)$ is also referred to as the point $(U_s, V_t)$ corresponding to the point $(X_s, Y_t)$ (that is, the point $(U_s, V_t)$ and the point $(X_s, Y_t)$ correspond).

For the corresponding points $(U_s, V_t)$ and $(X_s, Y_t)$, Formula (1) is true.

$$U_s - U_{vp} = r \times \cos \alpha, \quad V_t - V_{vp} = r \times \sin \alpha$$

$$X_s - X_{vp} = R \times \cos \alpha, \quad Y_t - Y_{vp} = R \times \sin \alpha \qquad (1)$$

By adopting transformation characteristics like those illustrated in FIG. 9 as the relationship between the distances (subject distances) r and R in Formula (1), the point $(U_s, V_t)$ the subject distance r within the threshold value THr away from the vanishing point $(U_{vp}, V_{vp})$ in the viewpoint transformation image "Image1" is moved to the point $(X_s, Y_t)$ in the movement transformation image "Image2" that is the same as the point $(U_s, V_t)$. Also, the point $(U_s, V_t)$ the subject distance r exceeding the threshold value THr away from the vanishing point $(U_{vp}, V_{vp})$ in the viewpoint transformation image "Image1" is moved to the point $(X_s, Y_t)$ that is closer to the vanishing point $(X_{vp}, Y_{vp})$ in the movement transformation image "Image2" to the extent that the subject distance r is large. As a result, in the viewpoint transformation image "Image1", standing objects in a collapsed state at positions far away from the vanishing point $(U_{vp}, V_{vp})$ are put into an upright state.

Herein, for example, as illustrated in FIG. 23, in the transformation characteristics, for the subject distance r less than or equal to the threshold value THr, the relationship between the subject distances r and R can be expressed by the formula r=R. Also, for the subject distance r exceeding the threshold value THr, the relationship between the subject distances r and R can be expressed by the formula $r=aR^2+bR+c$, where a, b, and c are predetermined coefficients, for example. By altering the coefficients a, b, and c, the transformation characteristics can be switched.

Also, although the transformation characteristics associate the subject distance r in the viewpoint transformation image "Image1" and the subject distance R in the movement transformation image "Image2" directly so to speak, the subject distance r and the subject distance R can be otherwise associated by treating the angle α as a parameter, for example.

Figure 24:
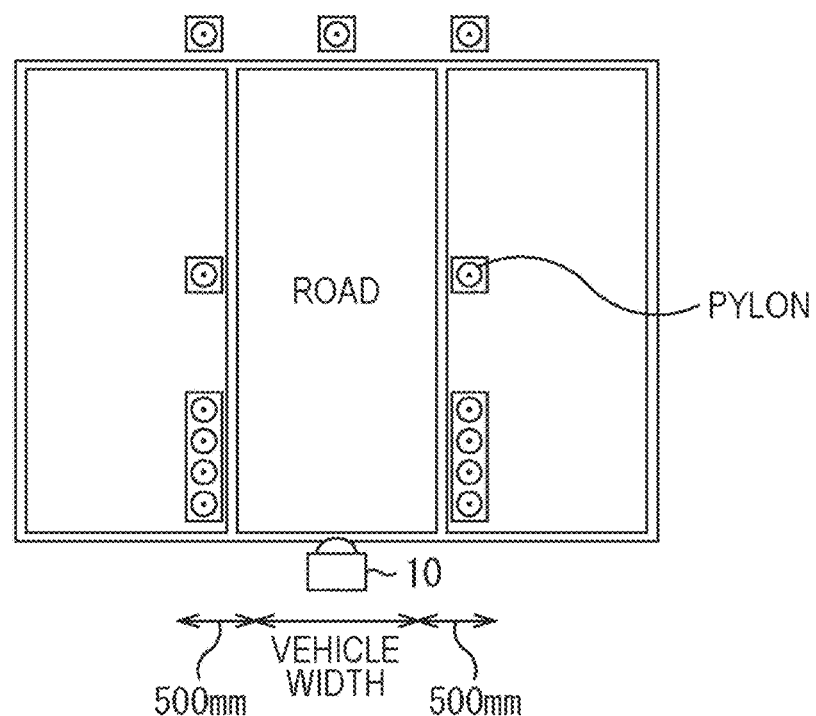
FIG. 24 is a diagram explaining an example of a method of deciding the threshold value THr.

FIG. 24 is a diagram explaining an example of a method of deciding the threshold value THr.

The threshold value THr can be decided according to a user operation, for example. Also, the threshold value THr can be decided according to standing objects appearing in the viewpoint transformation image, for example.

In other words, FIG. 24 is a plan view illustrating an example of a road (parking area) on which standing objects have been placed.

As illustrated in FIG. 24, standing objects such as pylons are placed on the road within a predetermined distance, such as within 500 mm, from either edge of the width of the vehicle 30 provided with the camera unit 10, and in the viewpoint transformation image, the distance between a point where a standing object collapsed by a predetermined angle such as 45 degrees appears and the vanishing point in the viewpoint transformation image can be decided as the threshold value THr.

Figure 25:
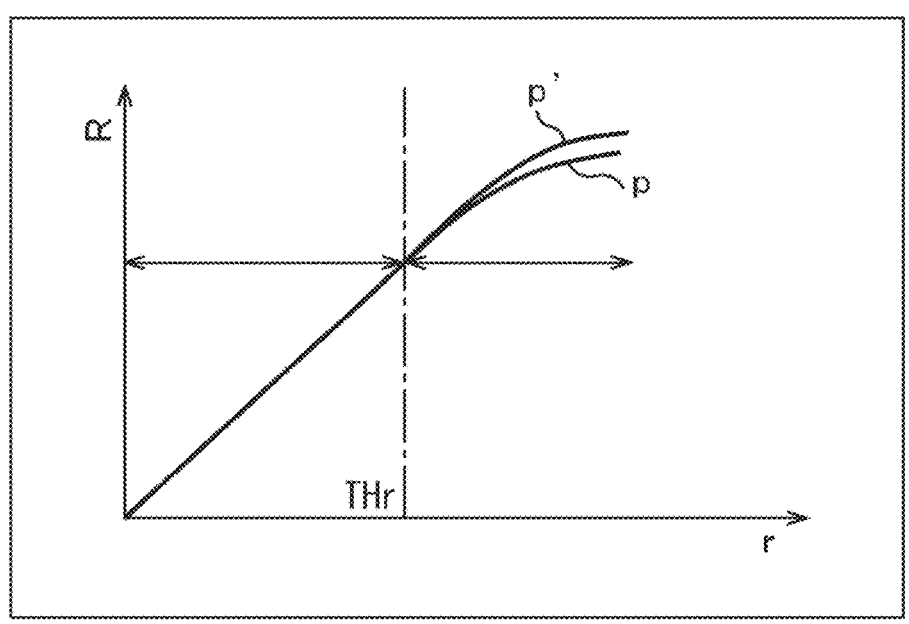
FIG. 25 is a diagram explaining an example of switching the transformation characteristics.

FIG. 25 is a diagram explaining an example of switching the transformation characteristics.

As explained in FIG. 11, the transformation characteristics to be used in the movement transformation can be switched.

In FIG. 25, transformation characteristics p and p' have been prepared as the transformation characteristics to be used in the movement transformation.

In the transformation characteristics p and p', in the case where the subject distance r before the movement transformation (in the viewpoint transformation image) is the threshold value THr or less, the subject distance r before the movement transformation and the subject distance R after the movement transformation (in the movement transformation image) match each other.

Additionally, in the transformation characteristics p and p', in the case where the subject distance r before the movement transformation exceeds the threshold value THr, the movement transformation is performed such that the subject distance R after the movement transformation approaches the vanishing point in the movement transformation image.

However, for the subject distance r exceeding the threshold value THr, as the subject distance r becomes larger, the proportion by which the subject distance R changes is less in the transformation characteristics p than in the transformation characteristics p'.

Consequently, in the case of using the transformation characteristics p in the movement transformation, compared to the case of using the transformation characteristics p', in the movement transformation, the subject position is moved closer in the direction of the vanishing point (a collapsed object is put into a more upright state).

In FIG. 25, because the threshold value THr of the transformation characteristics p and p' is the same, by switching between the transformation characteristics p and p', it is possible to change the degree to which standing objects that were collapsed due to the viewpoint transformation are to be raised upright in the movement transformation image obtained as a result of the movement transformation while also adjusting the angle of view of the range that appears in the movement transformation image, without changing how the range within the distance of the threshold value THr from the vanishing point looks.

Figure 26:
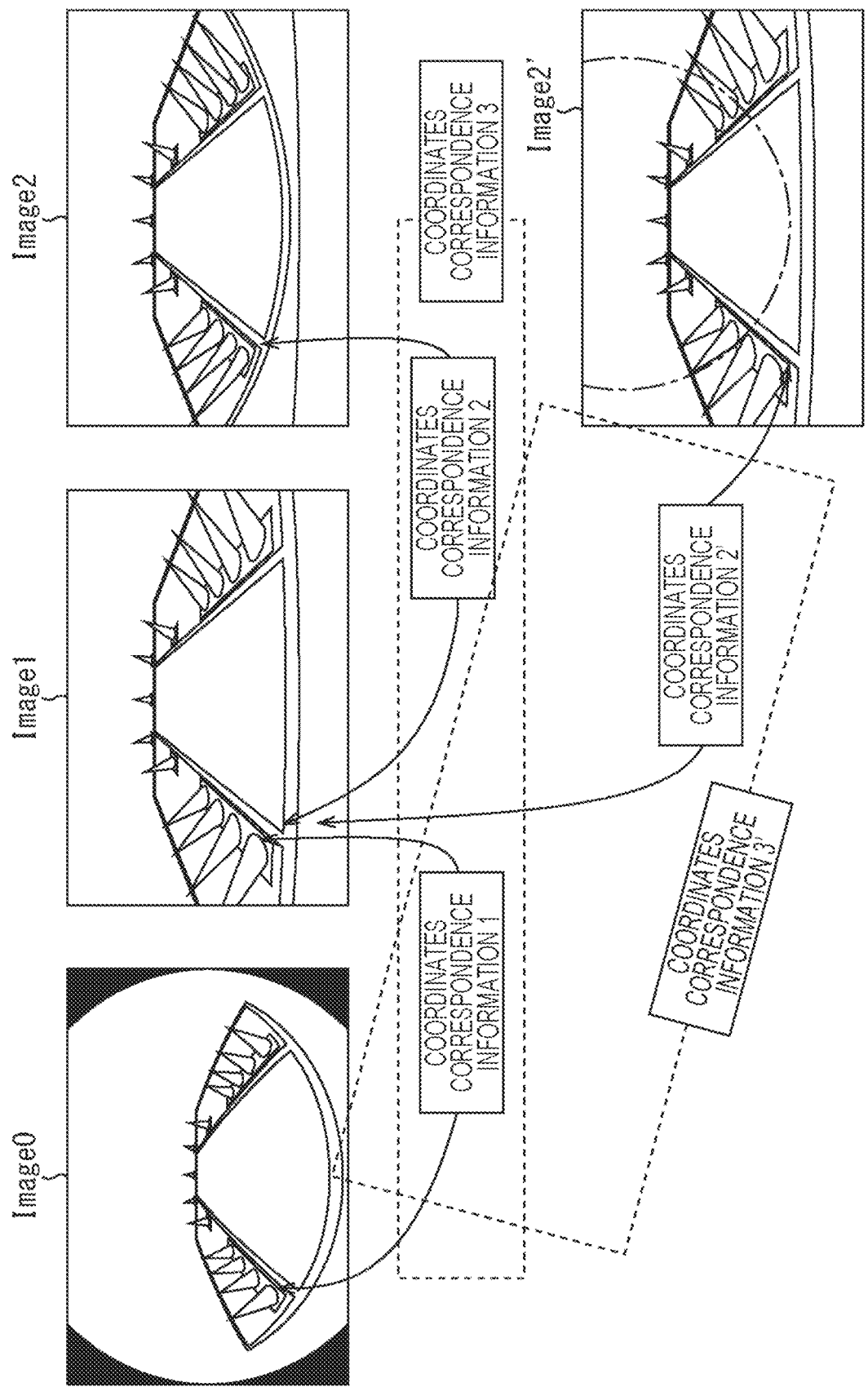
FIG. 26 is a diagram explaining the image transformation performed by the image processing unit 22 in the case where the transformation characteristics are switchable.

FIG. 26 is a diagram explaining the image transformation performed by the image processing unit 22 in the case where the transformation characteristics are switchable.

In FIG. 26, similarly to FIG. 22, the images "Image0", "Image1", and "Image2" are the taken image, the viewpoint transformation image, and the movement transformation image, respectively. Also, in FIG. 26, an image "Image2'" is a movement transformation image different from the movement transformation "Image2".

Herein, coordinate correspondence information for transforming the taken image "Image0" into the viewpoint transformation image "Image1" will be referred to as the coordinate correspondence information 1. Also, coordinate correspondence information for transforming the viewpoint transformation image "Image1" into the movement transformation image "Image2" in accordance with the transformation characteristics p of FIG. 25 will be referred to as the coordinate correspondence information 2. Furthermore, coordinate correspondence information for transforming the viewpoint transformation image "Image1" into the movement transformation image "Image2'" in accordance with the transformation characteristics p' of FIG. 25 will be referred to as the coordinate correspondence information 2'.

In the image processing unit 22, the coordinate correspondence information 1 can be stored in memory or generated according to a numerical formula, and in addition, the coordinate correspondence information 2 or coordinate correspondence information 3 that is a hybrid of the coordinate correspondence information 1 and the coordinate correspondence information 2 can be stored in memory or generated according to a numerical formula, while the coordinate correspondence information 2' or coordinate correspondence information 3 that is a hybrid of the coordinate correspondence information 1 and the coordinate correspondence information 2' can be stored in memory or generated according to a numerical formula. With this arrangement, the image transformation can be performed as explained in FIG. 22 while switching between the transformation characteristics p and p'.

Figure 27:
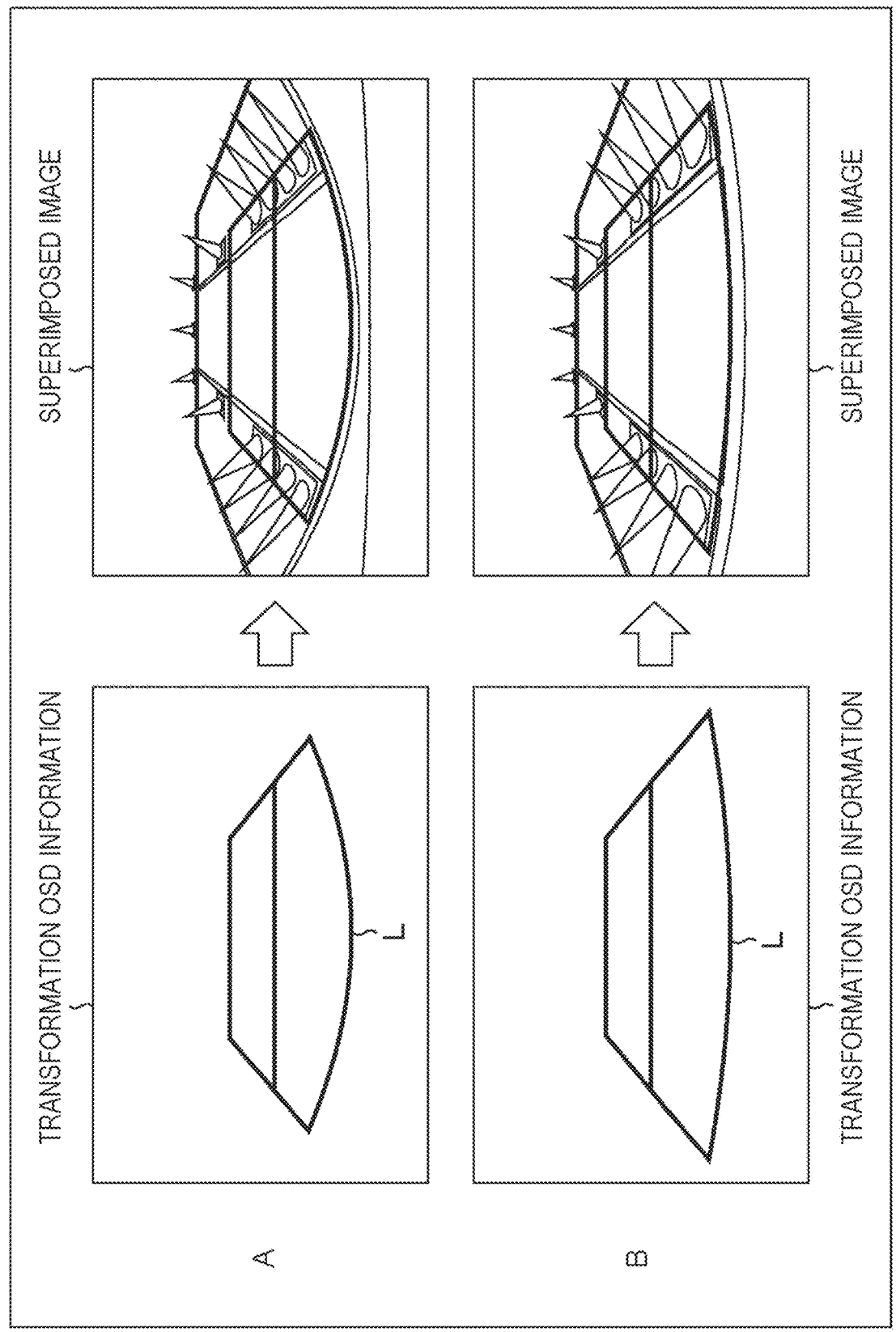
FIG. 27 is a diagram explaining an example of superimposing OSD information with the superimposing unit 47 in the case in which the transformation characteristics are switchable.

FIG. 27 is a diagram explaining an example of superimposing OSD information with the superimposing unit 47 (FIG. 3) in the case in which the transformation characteristics are switchable.

In the case in which the transformation characteristics are switchable, the superimposing unit 47 generates OSD information varying according to the transformation characteristics used in the movement transformation, and superimposes the generated OSD information onto the movement transformation image (or a cropped image cropped by the display region cropping unit 46 from the movement transformation image).

FIG. 27 illustrates an example of OSD information that acts as guidelines assisting with the driving of the vehicle 30 when the vehicle 30 is moving backward, and an example of a superimposed image obtained by superimposing the OSD information onto the movement transformation image.

In other words, A of FIG. 27 illustrates an example of OSD information (transformed OSD information) for the case in which the transformation characteristics p of FIG. 25 are used in the movement transformation, and a superimposed image in which the OSD information is superimposed.

B of FIG. 27 illustrates an example of OSD information for the case in which the transformation characteristics p' of FIG. 25 are used in the movement transformation, and a superimposed image in which the OSD information is superimposed.

In the superimposing unit 47, for example, OSD information that acts as guidelines suitable for (matched to) the viewpoint transformation image (hereinafter also referred to as standard OSD information) (not illustrated) is prepared, and the standard OSD information is transformed according to the transformation characteristics used in the movement transformation.

For example, in the case in which the transformation characteristics p of FIG. 25 are used in the movement transformation, the standard OSD information is transformed in accordance with the coordinate correspondence information 2 of FIG. 26, while in the case in which the transformation characteristics p' of FIG. 25 are used in the movement transformation, the standard OSD information is transformed in accordance with the coordinate correspondence information 2' of FIG. 26, and treated as the transformed OSD information.

The transformed OSD information becomes OSD information that is suitable for the movement transformation image obtained as a result of the movement transformation (OSD information that is consistent with the movement transformation image).

After that, the transformed OSD information obtained as a result of the transformation of the standard OSD information according to the transformation characteristics p or p' is superimposed onto the movement transformation image obtained as a result of the movement transformation according to the transformation characteristics p or p'.

As explained in FIG. 25, in the case of using the transformation characteristics p in the movement transformation, compared to the case of using the transformation characteristics p', in the movement transformation, the subject position is moved closer in the direction of the vanishing point.

For this reason, likewise in FIG. 27, the lines that form the guidelines acting as the transformed OSD information in the case of using the transformation characteristics p in A of FIG. 27, particularly a lower line L, are brought closer to the vanishing point than in the case of using the transformation characteristics p' in B of FIG. 27.

Note that, besides an image processing system that may be mounted onboard a moving body, the present technology can be applied to an application that processes and alters images, or any other device that handles images.

<Description of Computer to which Present Technology is Applied>

Next, the series of processing of the image processing unit 22 described above can be performed by hardware or software. In the case where the series of processing is performed by software, a program that constitutes the software is installed in a microcomputer, or the like.

Figure 28:
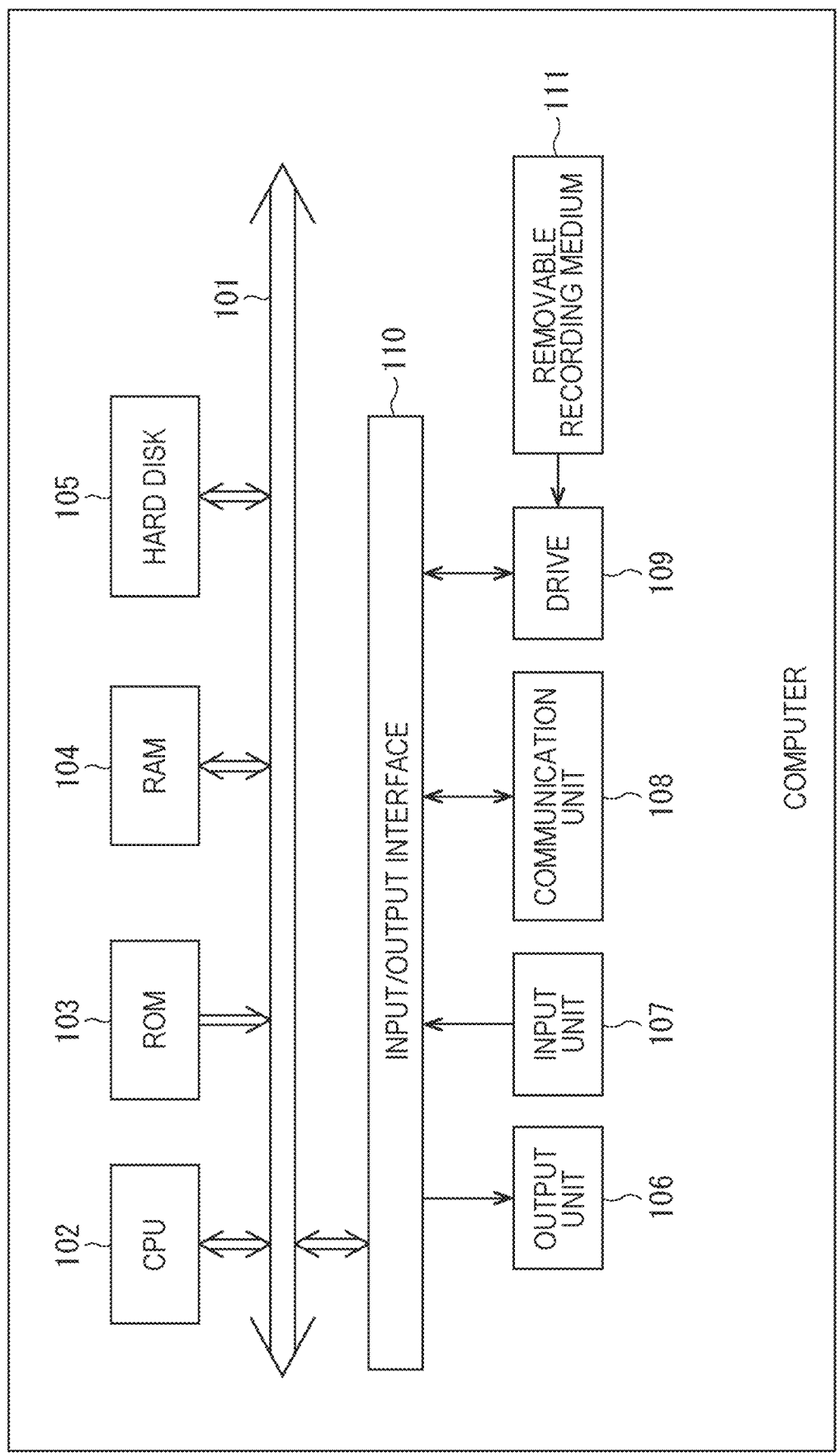
FIG. 28 is a block diagram illustrating a configuration example of an embodiment of a computer to which the present technology is applied.

FIG. 28 is a block diagram illustrating a configuration example of an embodiment of a computer in which a program for executing the above-mentioned series of processing is installed.

It is possible to record the program in advance on a hard disk 105 or a ROM 103 serving as a recording medium incorporated in the computer.

Alternatively, the program can be stored (recorded) on a removable recording medium 111. It is possible to provide such removable recording medium 111 as so-called packaged software. In this regard, an example of the removable recording medium 111 includes a flexible disk, a compact disc read-only memory (CD-ROM), a magneto-optical (MO) disk, a digital versatile disc (DVD), a magnetic disk, and a semiconductor memory.

Moreover, it is possible to install the program in the computer from the removable recording medium 111 as described above or can be downloaded to the computer via a communication network or a broadcasting network to be installed in the hard disk 105 included therein. That is, in one example, it is possible to transfer the program to the computer from a download site via a satellite for digital satellite broadcasting in a wireless manner or to transfer it to the computer via a network such as a local area network (LAN) or the Internet in a wired manner.

The computer has a built-in central processing unit (CPU) 102, and an input/output interface 110 is connected to the CPU 102 via a bus 101.

If a user inputs a command to the CPU 102 via the input/output interface 110 by operating an input unit 107 or the like, the CPU 102 executes the program stored in the read-only memory (ROM) 103 in accordance with the command. Alternatively, the CPU 102 loads the program stored in the hard disk 105 into a random access memory (RAM) 104 and executes the program.

This allows the CPU 102 to execute the processing in accordance with the above-mentioned flowchart or the processing performed by using the configuration of the above-mentioned block diagram. Then, in one example, the CPU 102 outputs the result obtained by the processing through an output unit 106 or transmits the result through a communication unit 108 via the input/output interface 110, as necessary, and further stores the result in the hard disk 105.

Moreover, the input unit 107 includes a keyboard, a mouse, a microphone, or the like. In addition, the output unit 106 includes a liquid crystal display (LCD), a speaker, or the like.

In this regard, the computer herein does not necessarily need to perform the processing in accordance with the program in order shown in the flowchart in a time series. That is, the processing performed by the computer in accordance with the program also includes processing executed in parallel or individually (e.g., parallel processing or object-oriented processing).

Further, it is possible to process the program by a single computer (processor) or to dispersedly process it by a plurality of computers. Furthermore, it is possible to transfer the program to a remote computer for execution.

Furthermore, a system, herein, means a set of a plurality of constituent elements (device, module (component), and the like), and all the constituent elements may or may not be received in the same housing. Thus, a plurality of devices received in different housings and connected via a network is a system, and any single device in which a plurality of modules is received in a single housing is also a system.

Moreover, embodiments of the present technology are not limited to the above embodiment, and various kinds of modification can be performed within the scope of the present technology.

In one example, the present technology can employ cloud-computing configuration in which a single function is shared by a plurality of devices via a network and is cooperatively processed by the plurality of devices.

Furthermore, the above-mentioned steps shown in the flowcharts can be executed by a single device or can be cooperatively executed by a plurality of devices.

Furthermore, in the case where a plurality of processes is included in a single step, the plurality of processes included in the single step can be executed by a single device or can be cooperatively executed by a plurality of devices.

Furthermore, the effects described herein are merely examples and are not limited, and other effects may be exerted.

Additionally, the present technology may also be configured as below.

<1>

An image processing device including:

an acquisition unit configured to acquire a target image to be processed; and a movement transformation unit configured to perform movement transformation of moving a subject position where a subject appears in the target image, depending on a subject distance from a vanishing point in the target image to the subject position.

<2>

The image processing device according to <1>, in which the movement transformation unit performs the movement transformation of moving the subject position depending on the subject distance, such that the subject distance becomes shorter than before the movement transformation.

<3>

The image processing device according to <2>, in which the movement transformation unit performs the movement transformation of moving the subject position to approach the vanishing point more closely as the subject distance becomes longer.

<4>

The image processing device according to <3>, in which the movement transformation unit performs the movement transformation of moving the subject position whose subject distance is a threshold value or greater.

<5>

The image processing device according to any one of <1> to <4>, further including:

a viewpoint transformation unit configured to perform a viewpoint transformation of transforming the target image into a viewpoint transformation image seen from a predetermined viewpoint, in which the movement transformation unit performs the movement transformation on the viewpoint transformation image.

<6>

The image processing device according to <5>, in which the viewpoint transformation unit performs the viewpoint transformation such that an optical axis at a time of taking an image from the predetermined viewpoint coincides with a vanishing point in the viewpoint transformation image.

<7>

The image processing device according to any one of <1> to <6>, in which the movement transformation unit performs the movement transformation in accordance with transformation characteristics that express a relationship between the subject distance before the movement transformation and the subject distance after the movement transformation, and the image processing device further includes a switching unit configured to switch the transformation characteristics used in the movement transformation.

<8>

The image processing device according to <7>, further including:

a superimposing unit configured to superimpose, onto a movement transformation image obtained as a result of the movement transformation, on-screen display (OSD) information varying according to the transformation characteristics used in the movement transformation.

<9>

An image processing method including:

acquiring a target image to be processed; and performing movement transformation of moving a subject position where a subject appears in the target image, depending on a subject distance from a vanishing point in the target image to the subject position.

<10>

A program causing a computer to function as:

an acquisition unit configured to acquire a target image to be processed; and a movement transformation unit configured to perform movement transformation of moving a subject position where a subject appears in the target image, depending on a subject distance from a vanishing point in the target image to the subject position.

REFERENCE SIGNS LIST

10 Camera unit
11 Optical system
12 Image sensor
13 Image quality control unit
21 Operation unit
22 Image processing unit
23 Settings storage memory
24 Output image unit
25 Display unit
30 Vehicle
31 to 34 Camera unit
41 Image acquisition unit
42 Projective transformation unit
43 Viewpoint transformation unit
44 Movement transformation unit
45 Switching unit
46 Display region cropping unit
47 Superimposing unit
101 Bus
102 CPU
103 ROM
104 RAM
105 Hard disk
106 Output unit
107 Input unit
108 Communication unit
109 Drive
110 Input/output interface
111 Removable recording medium

The invention claimed is:

1. An image processing device comprising:
processing circuitry configured to:
acquire a target image to be processed;
perform movement transformation of moving a subject position where a subject appears in the target image, depending on a subject distance from a vanishing point in the target image to the subject position, wherein the movement transformation is performed in accordance with transformation characteristics that express a relationship between the subject distance before the movement transformation and the subject distance after the movement transformation; and switch the transformation characteristics used in the movement transformation.

2. The image processing device according to claim 1, wherein the processing circuitry is configured to perform the movement transformation of moving the subject position depending on the subject distance, such that the subject distance becomes shorter than before the movement transformation.

3. The image processing device according to claim 1, wherein the processing circuitry is further configured to perform a viewpoint transformation of transforming the target image into a viewpoint transformation image seen from a predetermined viewpoint, and to perform the movement transformation on the viewpoint transformation image.

4. The image processing device according to claim 3, wherein the processing circuitry is configured to perform the viewpoint transformation such that an optical axis at a time of taking an image from the predetermined viewpoint coincides with a vanishing point in the viewpoint transformation image.

5. The image processing device according to claim 1, wherein the processing circuitry is further configured to superimpose, onto a movement transformation image obtained as a result of the movement transformation, on-screen display (OSD) information varying according to the transformation characteristics used in the movement transformation.

6. An image processing method comprising:

acquiring a target image to be processed;

performing movement transformation of moving a subject position where a subject appears in the target image, depending on a subject distance from a vanishing point in the target image to the subject position, wherein the movement transformation is performed in accordance with transformation characteristics that express a relationship between the subject distance before the movement transformation and the subject distance after the movement transformation; and switching the transformation characteristics used in the movement transformation.

7. A non-transitory computer readable medium containing instructions that, when executed by processing circuitry, perform an image processing method comprising:

acquiring a target image to be processed;

performing movement transformation of moving a subject position where a subject appears in the target image, depending on a subject distance from a vanishing point in the target image to the subject position, wherein the movement transformation is performed in accordance with transformation characteristics that express a relationship between the subject distance before the movement transformation and the subject distance after the movement transformation; and switching the transformation characteristics used in the movement transformation.

8. An image processing system comprising:

an imaging device configured to capture a target image to be processed; and processing circuitry configured to:

acquire the target image to be processed;

perform movement transformation of moving a subject position where a subject appears in the target image, depending on a subject distance from a vanishing point in the target image to the subject position, wherein the movement transformation is performed in accordance with transformation characteristics that express a relationship between the subject distance before the movement transformation and the subject distance after the movement transformation; and switch the transformation characteristics used in the movement transformation.

\* \* \* \* \*